US012677339B2

(12) United States Patent
Chen et al.

(10) Patent No.: US 12,677,339 B2
(45) Date of Patent: Jul. 7, 2026

(54) SENSING BY PROXY (SBP) TERMINATION FRAME WITH TERMINATION CONTROL FIELD

(71) Applicant: Intel Corporation, Santa Clara, CA (US)

(72) Inventors: Cheng Chen, Camas, WA (US); Dibakar Das, Hillsboro, OR (US); Carlos Cordeiro, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/125,911

(22) Filed: Mar. 24, 2023

(65) Prior Publication Data

US 2023/0232484 A1      Jul. 20, 2023

Related U.S. Application Data

(60) Provisional application No. 63/425,081, filed on Nov. 14, 2022.

(51) Int. Cl.
*H04W 76/18* (2018.01)
*H04L 5/00* (2006.01)
*H04L 5/14* (2006.01)

(52) U.S. Cl.
CPC ........... *H04W 76/18* (2018.02); *H04L 5/0048* (2013.01); *H04L 5/1438* (2013.01)

(58) Field of Classification Search
None
See application file for complete search history.

(56) References Cited

U.S. PATENT DOCUMENTS

| | | | |
|---|---|---|---|
| 2023/0388840 A1* | 11/2023 | Au | G01S 13/88 |
| 2024/0179550 A1* | 5/2024 | Au | H04L 5/0051 |
| 2024/0183936 A1* | 6/2024 | Au | H04L 67/12 |
| 2024/0314590 A1* | 9/2024 | Zhou | H04W 24/10 |
| 2025/0056284 A1* | 2/2025 | Dong | H04W 4/38 |

(Continued)

OTHER PUBLICATIONS

Du et al., "An Overview on IEEE 802.11bf: WLAN Sensing", Jul. 11, 2022, IEEE, All Pages. (Year: 2022).*

*Primary Examiner* — Otis L Thompson, Jr.
(74) *Attorney, Agent, or Firm* — Schwegman Lundberg & Woessner, P.A.

(57)            ABSTRACT

An access point station (AP) configured for performing wireless local area network (WLAN) sensing may establish one or more sensing-by-proxy (SBP) procedures with a non-AP station (STA). The AP may encode an SBP termination frame to terminate one or more of the established SBP procedures by the AP. The SBP termination frame may be encoded to include a Measurement Setup ID field and a SBP Termination Control field that may comprise a Terminate All SBP Setups subfield. The AP may set the Terminate All SBP Setups subfield to a first predetermined value to indicate that the AP is requesting that all established SBP procedures between the SBP initiator (i.e., the STA) and the SBP responder (i.e., the AP) are to be terminated. The AP may set the Terminate All SBP Setups subfield to a second predetermined value to indicate that the AP is requesting that a single one of the established SBP procedures is to be terminated. The SBP procedure to be terminated may be indicated by the Measurement Setup ID field.

20 Claims, 9 Drawing Sheets

(56)         References Cited

U.S. PATENT DOCUMENTS

| | | | | |
|---|---|---|---|---|
| 2025/0063403 | A1* | 2/2025 | Luo ....................... | H04W 24/08 |
| 2025/0159521 | A1* | 5/2025 | Dong ................... | H04W 24/10 |
| 2025/0175837 | A1* | 5/2025 | Dong ................... | H04W 76/11 |
| 2025/0184766 | A1* | 6/2025 | Dong ................... | H04W 24/10 |
| 2025/0275002 | A1* | 8/2025 | Chitrakar ............. | H04W 24/10 |
| 2025/0288600 | A1* | 9/2025 | Capozza ............... | A61K 45/06 |
| 2025/0301357 | A1* | 9/2025 | Dong ................... | H04W 24/10 |
| 2025/0317714 | A1* | 10/2025 | Dong ..................... | H04W 4/38 |
| 2025/0330923 | A1* | 10/2025 | Beg ................... | H04W 56/0015 |
| 2025/0338310 | A1* | 10/2025 | Lim ................ | H04W 74/0808 |
| 2025/0350971 | A1* | 11/2025 | Lin ...................... | H04W 24/10 |
| 2025/0358659 | A1* | 11/2025 | Chitrakar ............. | H04W 24/10 |

* cited by examiner

712

700

702

708

704

706

710

PROCESSING
CIRCUITRY

TRANSCEIVER

PHY CIRCUITRY

MAC CIRCUITRY

MEMORY

|  | Category | Public Action | Measurement Setup ID | TBD |
|---|---|---|---|---|
| Octets | 1 | 1 | 1 | TBD |

Format of the SBP Termination frame Action field

FIG. 10A

|  |  |  | 1002 | 1004 | 1006 |
|---|---|---|---|---|---|
|  | Category | Public Action | Measurement Setup ID | SBP Termination Control | SBP Parameters Element |
| Octets | 1 | 1 | 1 | 1 | 0 or variable |

Format for the SBP Termination frame Action field

FIG. 10B

|  | 1008 | 1010 | 1012 |  |
|---|---|---|---|---|
|  | Termination All SBP Setups | SBP Setup Unsuccess | Reserved | 1004 |
| Bits | 1 | 1 | 6 |  |

Format for the SBP Termination Control field

FIG. 10C

| Element ID | Length | Element ID Extension | SBP Parameters Control | Sensing Responder Addresses | Sensing Responder IDs |  |
|---|---|---|---|---|---|---|
| Octets: 1 | 1 | 1 | 2 | 0 or $n \times 6$ | variable | 1006 |

SBP Parameters element format

FIG. 10D

| SBP Request | Sensing Responder | Number of Sensing Responders | Mandatory Number of Responders | Preferred Responder List | Number of Preferred Responders | Mandatory Preferred Responder | Reserved |
|---|---|---|---|---|---|---|---|
| Bits: 1 | 1 | 4 | 1 | 1 | 4 | 1 | 3 |

SBP Parameters Control field format

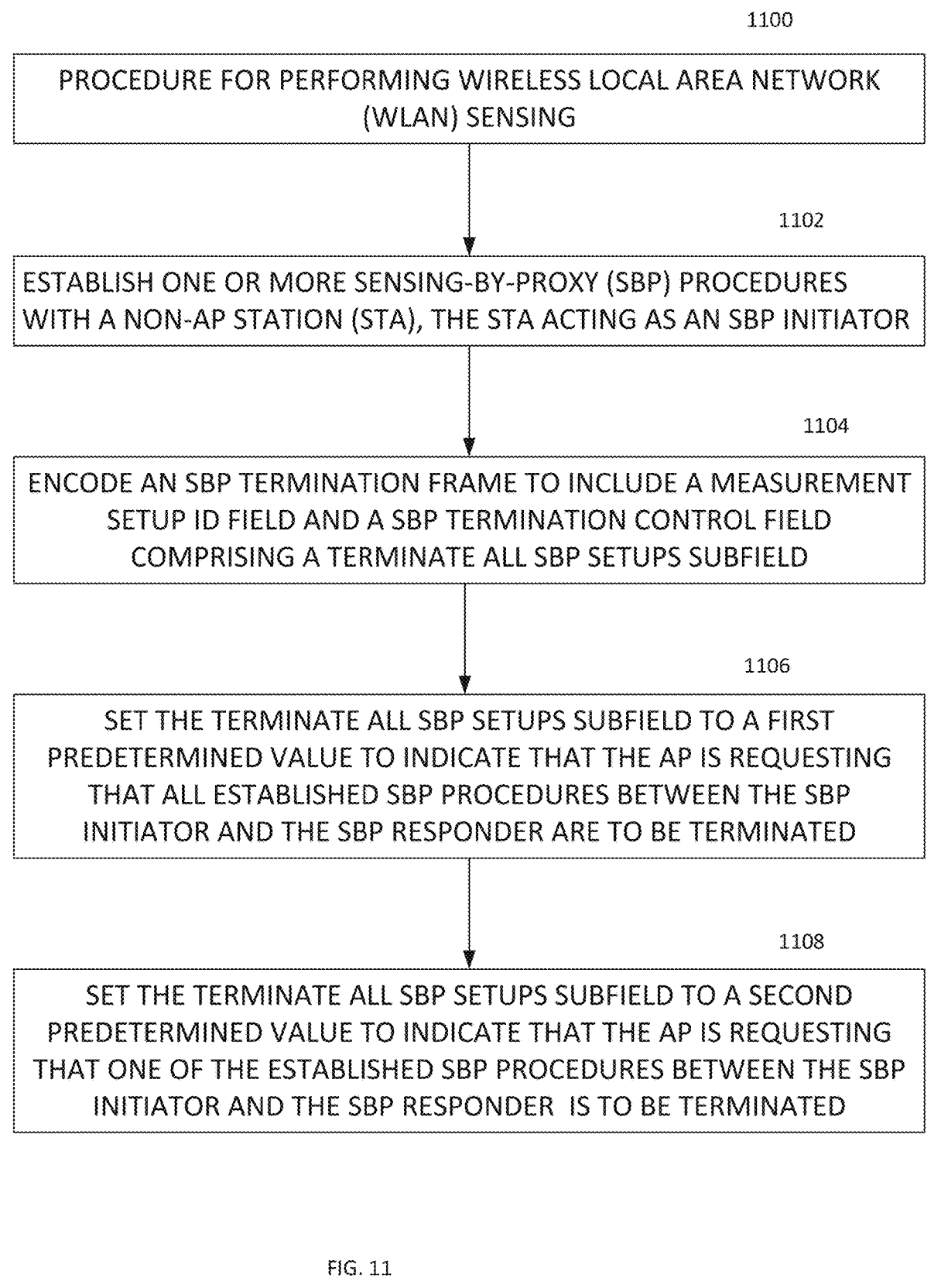

PROCEDURE FOR PERFORMING WIRELESS LOCAL AREA NETWORK (WLAN) SENSING

1102

ESTABLISH ONE OR MORE SENSING-BY-PROXY (SBP) PROCEDURES WITH A NON-AP STATION (STA), THE STA ACTING AS AN SBP INITIATOR

1104

ENCODE AN SBP TERMINATION FRAME TO INCLUDE A MEASUREMENT SETUP ID FIELD AND A SBP TERMINATION CONTROL FIELD COMPRISING A TERMINATE ALL SBP SETUPS SUBFIELD

1106

SET THE TERMINATE ALL SBP SETUPS SUBFIELD TO A FIRST PREDETERMINED VALUE TO INDICATE THAT THE AP IS REQUESTING THAT ALL ESTABLISHED SBP PROCEDURES BETWEEN THE SBP INITIATOR AND THE SBP RESPONDER ARE TO BE TERMINATED

1108

SET THE TERMINATE ALL SBP SETUPS SUBFIELD TO A SECOND PREDETERMINED VALUE TO INDICATE THAT THE AP IS REQUESTING THAT ONE OF THE ESTABLISHED SBP PROCEDURES BETWEEN THE SBP INITIATOR AND THE SBP RESPONDER IS TO BE TERMINATED

FIG. 11

SENSING BY PROXY (SBP) TERMINATION FRAME WITH TERMINATION CONTROL FIELD

PRIORITY CLAIM

This application claims priority under 35 U.S.C. 119(e) to U.S. Provisional Patent Application Ser. No. 63/425,081, filed Nov. 14, 2022 [reference number AF0503-Z], which is incorporated herein by reference in its entirety.

TECHNICAL FIELD

Embodiments pertain to wireless communications. Some embodiments pertain to wireless networks including wireless local area networks (WLANs) and Wi-Fi networks including networks operating in accordance with the IEEE 802.11 family of standards. Some embodiments relate to extremely high throughput (EHT) communications. Some embodiments pertain to WLAN sensing in accordance with draft standard IEEE P802.11bf.

BACKGROUND

WLAN sensing is the use of PHY and MAC features of IEEE 802.11 stations to obtain measurements that may be useful to estimate features such as range, velocity, and motion of objects in an area of interest. Measurements obtained with WLAN sensing may be used to enable applications such as presence detection and gesture classification. One issue with WLAN sensing is terminating one or more existing sensing-by-proxy (SBP) procedures.

BRIEF DESCRIPTION OF THE DRAWINGS

The present disclosure is illustrated by way of example and not limitation in the figures of the accompanying drawings, in which like references indicate similar elements and in which:

FIG. 10A illustrates a format of the SBP Termination frame Action field, in accordance with some embodiments.

FIG. 10B illustrates a format for the SBP Termination frame Action field with an SBP termination control field and an SBP parameters element field, in accordance with some embodiments.

FIG. 10C illustrates a format for the SBP Termination Control field, in accordance with some embodiments.

FIG. 10D illustrates a format of an SBP Parameters element, in accordance with some embodiments.

FIG. 10E illustrates a format of an SBP Parameters Control field, in accordance with some embodiments.

FIG. 11 illustrates a procedure for performing wireless local area network (WLAN) sensing in accordance with some embodiments.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

WLAN sensing is the use of PHY and MAC features of IEEE 802.11 stations to obtain measurements that may be useful to estimate features such as range, velocity, and motion of objects in an area of interest. Measurements obtained with WLAN sensing may be used to enable applications such as presence detection and gesture classification. IEEE 802.11bf is a draft standard that aims to standardize WLAN sensing that uses Wi-Fi technology to perform radar-like applications such as detecting motion in a room or detecting when a person approaches a target device. Sensing is performed by tracking channel estimates obtained when decoding multiple Wi-Fi packets over time and detecting variations that indicate an event of interest.

In some embodiments, an access point station (AP) configured for performing wireless local area network (WLAN) sensing may establish one or more sensing-by-proxy (SBP) procedures with a non-AP station (STA). The AP may encode an SBP termination frame to terminate one or more of the established SBP procedures by the AP. The SBP termination frame may be encoded to include a Measurement Setup ID field and a SBP Termination Control field that may comprise a Terminate All SBP Setups subfield. The AP may set the Terminate All SBP Setups subfield to a first predetermined value to indicate that the AP is requesting that all established SBP procedures between the SBP initiator (i.e., the STA) and the SBP responder (i.e., the AP) are to be terminated. The AP may set the Terminate All SBP Setups subfield to a second predetermined value to indicate that the AP is requesting that a single one of the established SBP procedures is to be terminated. The SBP procedure to be terminated may be indicated by the Measurement Setup ID field. These embodiments, as well as others, are described in more detail below.

Figures 1, 2:
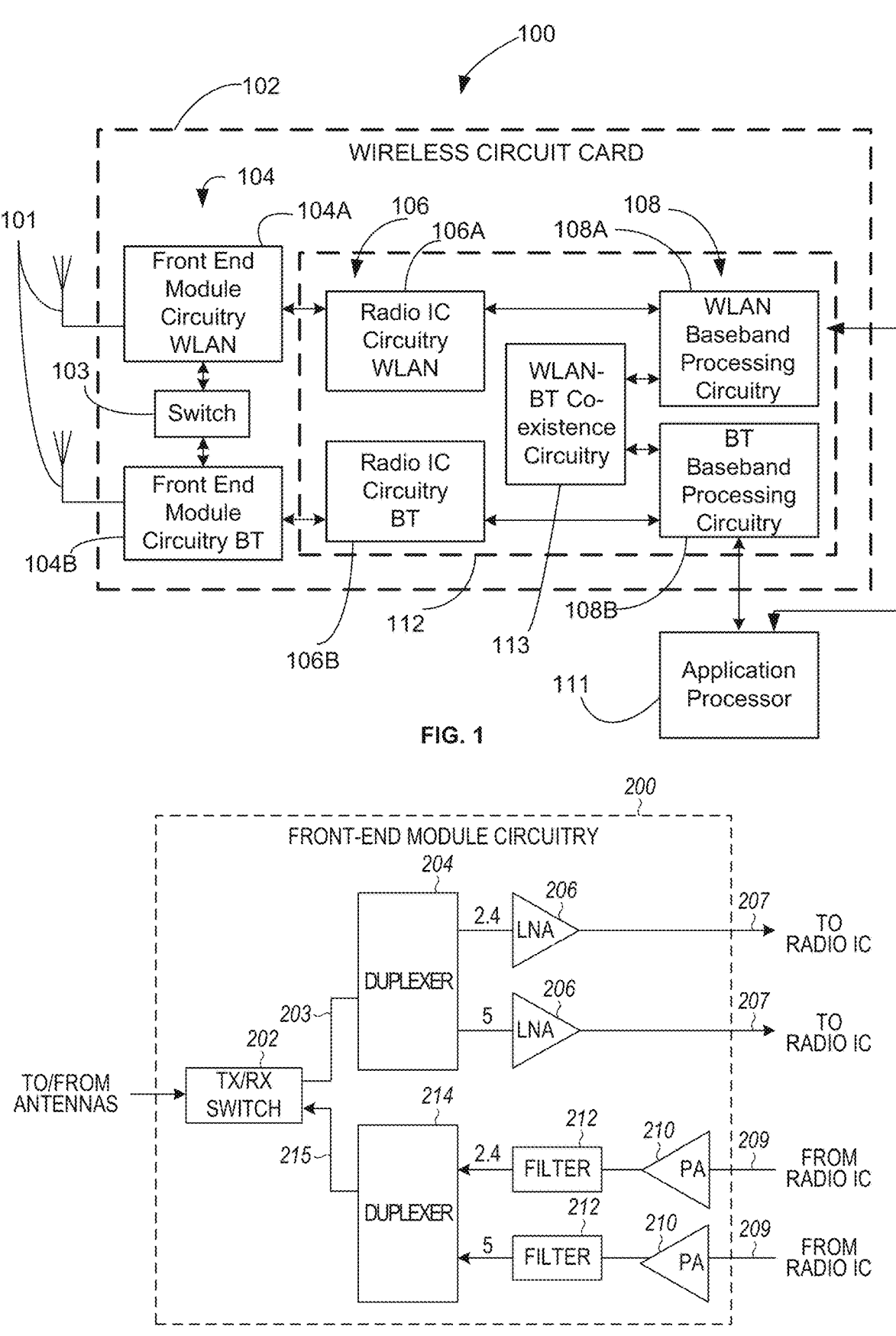
FIG. 1 is a block diagram of a radio architecture in accordance with some embodiments.
FIG. 2 illustrates a front-end module circuitry for use in the radio architecture of FIG. 1 in accordance with some embodiments.

FIG. 1 is a block diagram of a radio architecture 100 in accordance with some embodiments. Radio architecture 100 may include radio front-end module (FEM) circuitry 104, radio IC circuitry 106 and baseband processing circuitry 108. Radio architecture 100 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 104 may include a WLAN or Wi-Fi FEM circuitry 104A and a Bluetooth (BT) FEM circuitry 104B. The WLAN FEM circuitry 104A may include a receive signal path comprising circuitry configured to operate on WLAN RF signals received from one or more antennas 101, to amplify the received signals and to provide the amplified versions of the received signals to the WLAN radio IC circuitry 106A for further processing. The BT FEM circuitry 104B may include a receive signal path which may include circuitry configured to operate on BT RF signals received from one or more antennas 101, to amplify the received signals and to provide the amplified versions of the received signals to the BT radio IC circuitry 106B for further processing. FEM circuitry 104A may also include a transmit signal path which may include circuitry configured to amplify WLAN signals provided by the radio IC circuitry 106A for wireless transmission by one or more of the antennas 101. In addition, FEM circuitry 104B may also include a transmit signal path which may include circuitry configured to amplify BT signals provided by the radio IC circuitry 106B for wireless transmission by the one or more antennas. In the embodiment of FIG. 1, although FEM 104A and FEM 104B are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 106 as shown may include WLAN radio IC circuitry 106A and BT radio IC circuitry 106B. The WLAN radio IC circuitry 106A may include a receive signal path which may include circuitry to down-convert WLAN RF signals received from the FEM circuitry 104A and provide baseband signals to WLAN baseband processing circuitry 108A. BT radio IC circuitry 106B may in turn include a receive signal path which may include circuitry to down-convert BT RF signals received from the FEM circuitry 104B and provide baseband signals to BT baseband processing circuitry 108B. WLAN radio IC circuitry 106A may also include a transmit signal path which may include circuitry to up-convert WLAN baseband signals provided by the WLAN baseband processing circuitry 108A and provide WLAN RF output signals to the FEM circuitry 104A for subsequent wireless transmission by the one or more antennas 101. BT radio IC circuitry 106B may also include a transmit signal path which may include circuitry to up-convert BT baseband signals provided by the BT baseband processing circuitry 108B and provide BT RF output signals to the FEM circuitry 104B for subsequent wireless transmission by the one or more antennas 101. In the embodiment of FIG. 1, although radio IC circuitries 106A and 106B are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuity 108 may include a WLAN baseband processing circuitry 108A and a BT baseband processing circuitry 108B. The WLAN baseband processing circuitry 108A may include a memory, such as, for example, a set of RAM arrays in a Fast Fourier Transform or Inverse Fast Fourier Transform block (not shown) of the WLAN baseband processing circuitry 108A. Each of the WLAN baseband circuitry 108A and the BT baseband circuitry 108B may further include one or more processors and control logic to process the signals received from the corresponding WLAN or BT receive signal path of the radio IC circuitry 106, and to also generate corresponding WLAN or BT baseband signals for the transmit signal path of the radio IC circuitry 106. Each of the baseband processing circuitries 108A and 108B may further include physical layer (PHY) and medium access control layer (MAC) circuitry, and may further interface with application processor 111 for generation and processing of the baseband signals and for controlling operations of the radio IC circuitry 106.

Referring still to FIG. 1, according to the shown embodiment, WLAN-BT coexistence circuitry 113 may include logic providing an interface between the WLAN baseband circuitry 108A and the BT baseband circuitry 108B to enable use cases requiring WLAN and BT coexistence. In addition, a switch 103 may be provided between the WLAN FEM circuitry 104A and the BT FEM circuitry 104B to allow switching between the WLAN and BT radios according to application needs. In addition, although the antennas 101 are depicted as being respectively connected to the WLAN FEM circuitry 104A and the BT FEM circuitry 104B, embodiments include within their scope the sharing of one or more antennas as between the WLAN and BT FEMs, or the provision of more than one antenna connected to each of FEM 104A or 104B.

In some embodiments, the front-end module circuitry 104, the radio IC circuitry 106, and baseband processing circuitry 108 may be provided on a single radio card, such as wireless radio card 102. In some other embodiments, the one or more antennas 101, the FEM circuitry 104 and the radio IC circuitry 106 may be provided on a single radio card. In some other embodiments, the radio IC circuitry 106 and the baseband processing circuitry 108 may be provided on a single chip or IC, such as IC 112.

In some embodiments, the wireless radio card 102 may include a WLAN radio card and may be configured for Wi-Fi communications, although the scope of the embodiments is not limited in this respect. In some of these embodiments, the radio architecture 100 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 100 may be part of a Wi-Fi communication station (STA) such as a wireless access point (AP), a base station or a mobile device including a Wi-Fi device. In some of these embodiments, radio architecture 100 may be configured to transmit and receive signals in accordance with specific communication standards and/or protocols, such as any of the Institute of Electrical and Electronics Engineers (IEEE) standards including, IEEE 802.11n-2009, IEEE 802.11-2012, IEEE 802.11-2016, IEEE 802.11ac, and/or IEEE 802.11ax standards and/or proposed specifications for WLANs, although the scope of embodiments is not limited in this respect. Radio architecture 100 may also be suitable to transmit and/or receive communications in accordance with other techniques and standards.

In some embodiments, the radio architecture 100 may be configured for high-efficiency (HE) Wi-Fi (HEW) communications in accordance with the IEEE 802.11ax standard. In these embodiments, the radio architecture 100 may be configured to communicate in accordance with an OFDMA technique, although the scope of the embodiments is not limited in this respect.

In some other embodiments, the radio architecture 100 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 1, the BT baseband circuitry 108B may be compliant with a Bluetooth (BT) connectivity standard such as Bluetooth, Bluetooth 4.0 or Bluetooth 5.0, or any other iteration of the Bluetooth Standard. In embodiments that include BT functionality as shown for example in FIG. 1, the radio architecture 100 may be configured to establish a BT synchronous connection oriented (SCO) link and/or a BT low energy (BT LE) link. In some of the embodiments that include functionality, the radio architecture 100 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 1, the functions of a BT radio card and WLAN radio card may be combined on a single wireless radio card, such as single wireless radio card 102, although embodiments are not so limited, and include within their scope discrete WLAN and BT radio cards In some embodiments, the radio-architecture 100 may include other radio cards, such as a cellular radio card configured for cellular (e.g., 3GPP such as LTE, LTE-Advanced or 5G communications).

In some IEEE 802.11 embodiments, the radio architecture 100 may be configured for communication over various channel bandwidths including bandwidths having center frequencies of about 900 MHz, 2.4 GHz, 5 GHz, and bandwidths of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. The scope of the embodiments is not limited with respect to the above center frequencies however.

FIG. 2 illustrates FEM circuitry 200 in accordance with some embodiments. The FEM circuitry 200 is one example of circuitry that may be suitable for use as the WLAN and/or BT FEM circuitry 104A/104B (FIG. 1), although other circuitry configurations may also be suitable.

In some embodiments, the FEM circuitry 200 may include a TX/RX switch 202 to switch between transmit mode and receive mode operation. The FEM circuitry 200 may include a receive signal path and a transmit signal path. The receive signal path of the FEM circuitry 200 may include a low-noise amplifier (LNA) 206 to amplify received RF signals 203 and provide the amplified received RF signals 207 as an output (e.g., to the radio IC circuitry 106 (FIG. 1)). The transmit signal path of the circuitry 200 may include a power amplifier (PA) to amplify input RF signals 209 (e.g., provided by the radio IC circuitry 106), and one or more filters 212, such as band-pass filters (BPFs), low-pass filters (LPFs) or other types of filters, to generate RF signals 215 for subsequent transmission (e.g., by one or more of the antennas 101 (FIG. 1)).

In some dual-mode embodiments for Wi-Fi communication, the FEM circuitry 200 may be configured to operate in either the 2.4 GHz frequency spectrum or the 5 GHz frequency spectrum. In these embodiments, the receive signal path of the FEM circuitry 200 may include a receive signal path duplexer 204 to separate the signals from each spectrum as well as provide a separate LNA 206 for each spectrum as shown. In these embodiments, the transmit signal path of the FEM circuitry 200 may also include a power amplifier 210 and a filter 212, such as a BPF, a LPF or another type of filter for each frequency spectrum and a transmit signal path duplexer 214 to provide the signals of one of the different spectrums onto a single transmit path for subsequent transmission by the one or more of the antennas 101 (FIG. 1). In some embodiments, BT communications may utilize the 2.4 GHZ signal paths and may utilize the same FEM circuitry 200 as the one used for WLAN communications.

Figure 3:
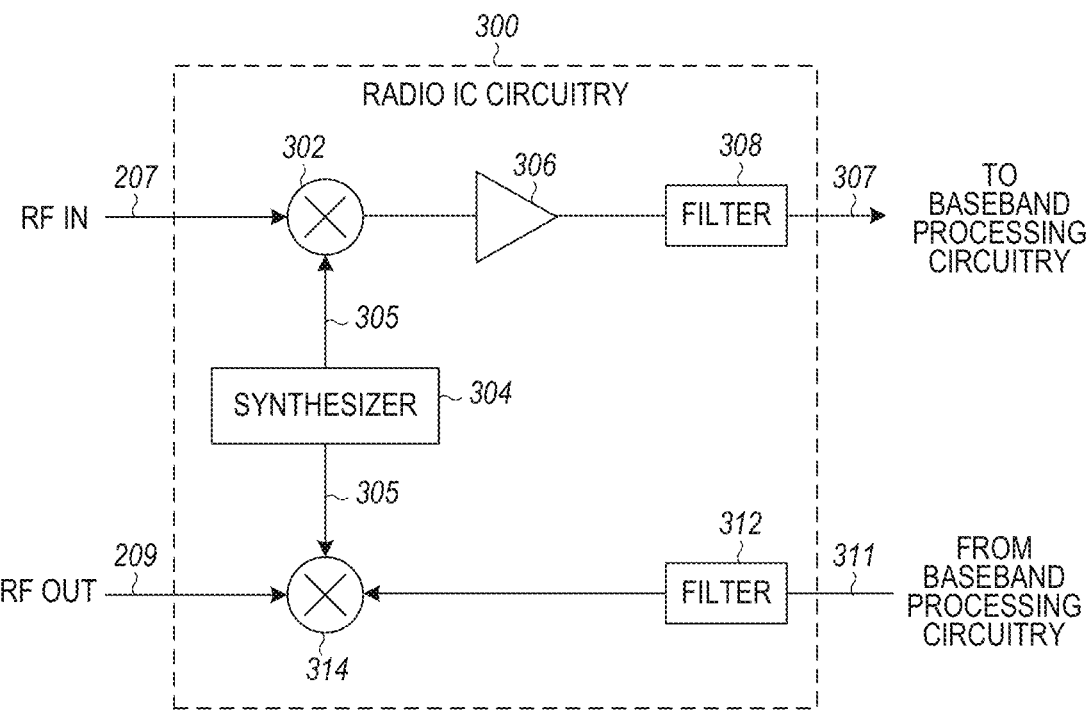
FIG. 3 illustrates a radio IC circuitry for use in the radio architecture of FIG. 1 in accordance with some embodiments.

FIG. 3 illustrates radio integrated circuit (IC) circuitry 300 in accordance with some embodiments. The radio IC circuitry 300 is one example of circuitry that may be suitable for use as the WLAN or BT radio IC circuitry 106A/106B (FIG. 1), although other circuitry configurations may also be suitable.

In some embodiments, the radio IC circuitry 300 may include a receive signal path and a transmit signal path. The receive signal path of the radio IC circuitry 300 may include at least mixer circuitry 302, such as, for example, down-conversion mixer circuitry, amplifier circuitry 306 and filter circuitry 308. The transmit signal path of the radio IC circuitry 300 may include at least filter circuitry 312 and mixer circuitry 314, such as, for example, up-conversion mixer circuitry. Radio IC circuitry 300 may also include synthesizer circuitry 304 for synthesizing a frequency 305 for use by the mixer circuitry 302 and the mixer circuitry 314. The mixer circuitry 302 and/or 314 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 3 illustrates only a simplified version of a radio IC circuitry, and may include, although not shown, embodiments where each of the depicted circuitries may include more than one component. For instance, mixer circuitry 320 and/or 314 may each include one or more mixers, and filter circuitries 308 and/or 312 may each include one or more filters, such as one or more BPFs and/or LPFs according to application needs. For example, when mixer circuitries are of the direct-conversion type, they may each include two or more mixers.

In some embodiments, mixer circuitry 302 may be configured to down-convert RF signals 207 received from the FEM circuitry 104 (FIG. 1) based on the synthesized frequency 305 provided by synthesizer circuitry 304. The amplifier circuitry 306 may be configured to amplify the down-converted signals and the filter circuitry 308 may include a LPF configured to remove unwanted signals from the down-converted signals to generate output baseband signals 307. Output baseband signals 307 may be provided to the baseband processing circuitry 108 (FIG. 1) for further processing. In some embodiments, the output baseband signals 307 may be zero-frequency baseband signals, although this is not a requirement. In some embodiments, mixer circuitry 302 may comprise passive mixers, although the scope of the embodiments is not limited in this respect.

In some embodiments, the mixer circuitry 314 may be configured to up-convert input baseband signals 311 based on the synthesized frequency 305 provided by the synthesizer circuitry 304 to generate RF output signals 209 for the FEM circuitry 104. The baseband signals 311 may be provided by the baseband processing circuitry 108 and may be filtered by filter circuitry 312. The filter circuitry 312 may include a LPF or a BPF, although the scope of the embodiments is not limited in this respect.

In some embodiments, the mixer circuitry 302 and the mixer circuitry 314 may each include two or more mixers and may be arranged for quadrature down-conversion and/or up-conversion respectively with the help of synthesizer 304. In some embodiments, the mixer circuitry 302 and the mixer circuitry 314 may each include two or more mixers each configured for image rejection (e.g., Hartley image rejection). In some embodiments, the mixer circuitry 302 and the mixer circuitry 314 may be arranged for direct down-conversion and/or direct up-conversion, respectively. In some embodiments, the mixer circuitry 302 and the mixer circuitry 314 may be configured for super-heterodyne operation, although this is not a requirement.

Mixer circuitry 302 may comprise, according to one embodiment: quadrature passive mixers (e.g., for the in-phase (I) and quadrature phase (Q) paths). In such an embodiment, RF input signal 207 from FIG. 3 may be down-converted to provide I and Q baseband output signals to be sent to the baseband processor Quadrature passive mixers may be driven by zero and ninety-degree time-varying LO switching signals provided by a quadrature circuitry which may be configured to receive a LO frequency ($f_{LO}$) from a local oscillator or a synthesizer, such as LO frequency 305 of synthesizer 304 (FIG. 3). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have a 25% duty cycle and a 50% offset. In some embodiments, each branch of the mixer circuitry (e.g., the in-phase (I) and quadrature phase (Q) path) may operate at a 25% duty cycle, which may result in a significant reduction is power consumption.

The RF input signal 207 (FIG. 2) may comprise a balanced signal, although the scope of the embodiments is not limited in this respect. The I and Q baseband output signals may be provided to low-nose amplifier, such as amplifier circuitry 306 (FIG. 3) or to filter circuitry 308 (FIG. 3).

In some embodiments, the output baseband signals 307 and the input baseband signals 311 may be analog baseband signals, although the scope of the embodiments is not limited in this respect. In some alternate embodiments, the output baseband signals 307 and the input baseband signals 311 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 304 may be a fractional-N synthesizer or a fractional N/N+1 synthesizer, although the scope of the embodiments is not limited in this respect as other types of frequency synthesizers may be suitable. For example, synthesizer circuitry 304 may be a delta-sigma synthesizer, a frequency multiplier, or a synthesizer comprising a phase-locked loop with a frequency divider. According to some embodiments, the synthesizer circuitry 304 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuit 304 may be provided by a voltage controlled oscillator (VCO), although that is not a requirement. A divider control input may further be provided by either the baseband processing circuitry 108 (FIG. 1) or the application processor 111 (FIG. 1) depending on the desired output frequency 305. In some embodiments, a divider control input (e.g., N) may be determined from a look-up table (e.g., within a Wi-Fi card) based on a channel number and a channel center frequency as determined or indicated by the application processor 111.

In some embodiments, synthesizer circuitry 304 may be configured to generate a carrier frequency as the output frequency 305, while in other embodiments, the output frequency 305 may be a fraction of the carrier frequency (e.g., one-half the carrier frequency, one-third the carrier frequency). In some embodiments, the output frequency 305 may be a LO frequency ($f_{LO}$).

Figure 4:
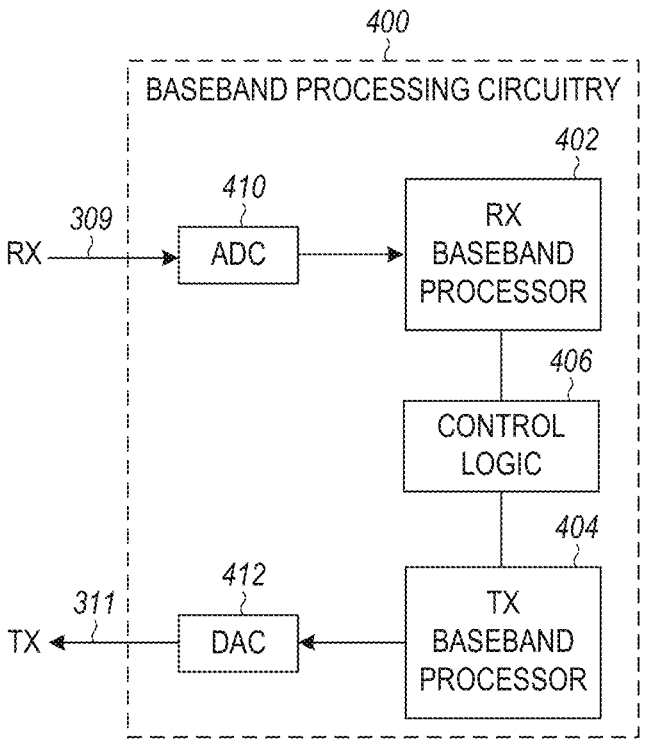
FIG. 4 illustrates a baseband processing circuitry for use in the radio architecture of FIG. 1 in accordance with some embodiments.

FIG. 4 illustrates a functional block diagram of baseband processing circuitry 400 in accordance with some embodiments. The baseband processing circuitry 400 is one example of circuitry that may be suitable for use as the baseband processing circuitry 108 (FIG. 1), although other circuitry configurations may also be suitable. The baseband processing circuitry 400 may include a receive baseband processor (RX BBP) 402 for processing receive baseband signals 309 provided by the radio IC circuitry 106 (FIG. 1) and a transmit baseband processor (TX BBP) 404 for generating transmit baseband signals 311 for the radio IC circuitry 106. The baseband processing circuitry 400 may also include control logic 406 for coordinating the operations of the baseband processing circuitry 400.

In some embodiments (e.g., when analog baseband signals are exchanged between the baseband processing circuitry 400 and the radio IC circuitry 106), the baseband processing circuitry 400 may include ADC 410 to convert analog baseband signals received from the radio IC circuitry 106 to digital baseband signals for processing by the RX BBP 402. In these embodiments, the baseband processing circuitry 400 may also include DAC 412 to convert digital baseband signals from the TX BBP 404 to analog baseband signals.

In some embodiments that communicate OFDM signals or OFDMA signals, such as through baseband processor 108A, the transmit baseband processor 404 may be configured to generate OFDM or OFDMA signals as appropriate for transmission by performing an inverse fast Fourier transform (IFFT). The receive baseband processor 402 may be configured to process received OFDM signals or OFDMA signals by performing an FFT. In some embodiments, the receive baseband processor 402 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring to FIG. 1, in some embodiments, the antennas 101 (FIG. 1) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 101 may each include a set of phased-array antennas, although embodiments are not so limited.

Although the radio-architecture 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Figure 5:
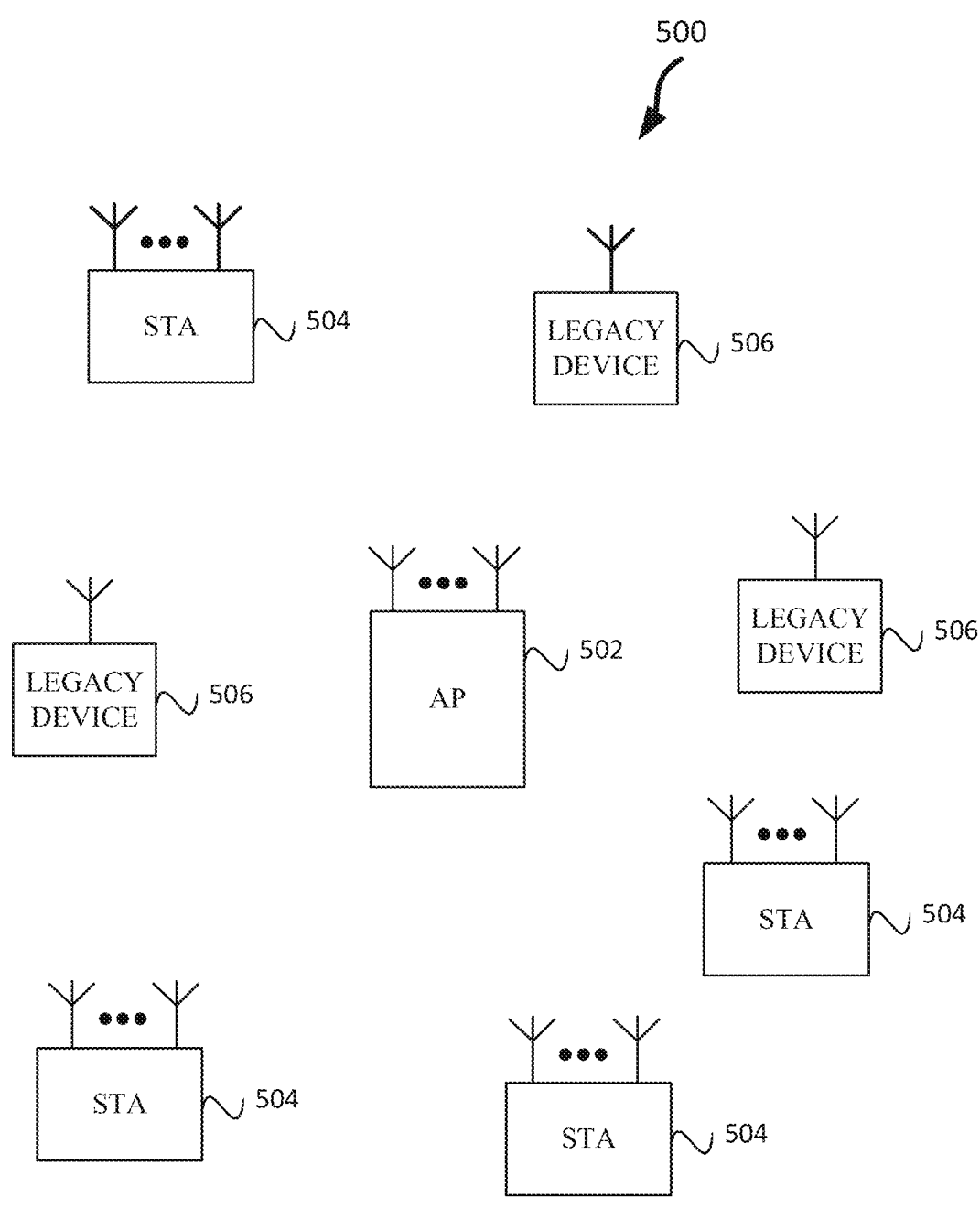
FIG. 5 illustrates a WLAN in accordance with some embodiments.

FIG. 5 illustrates a WLAN 500 in accordance with some embodiments. The WLAN 500 may comprise a basis service set (BSS) that may include an access point (AP) 502, a plurality of stations (STAs) 504, and a plurality of legacy devices 506. In some embodiments, the STAs 504 and/or AP 502 are configured to operate in accordance with IEEE 802.11be extremely high throughput (EHT) and/or high efficiency (HE) IEEE 802.11ax. In some embodiments, the STAs 504 and/or AP 520 are configured to operate in accordance with IEEE 802.11az. In some embodiments, IEEE 802.11EHT may be termed Next Generation 802.11 or a later standard. The STA 504 and AP 502 (or apparatuses of) may be configured to operate in accordance with IEEE P802.11be™/D2.2, October 2022, IEEE P802.11-REVme™/D2.0, October 2022, which are incorporated herein by reference in their entirety. The AP 502 and/or STA 504 may operate in accordance with different versions of the communication standards.

The AP 502 may be an AP using the IEEE 802.11 to transmit and receive. The AP 502 may be a base station. The AP 502 may use other communications protocols as well as the IEEE 802.11 protocol. The EHT protocol may be termed a different name in accordance with some embodiments. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO). There may be more than one EHT AP 502 that is part of an extended service set (ESS). A controller (not illustrated) may store information that is common to the more than one APs 502 and may control more than one BSS, e.g., assign primary channels, colors, etc. AP 502 may be connected to the internet.

The legacy devices 506 may operate in accordance with one or more of IEEE 802.11 a/b/g/n/ac/ad/af/ah/aj/ay/ax/be, or another legacy wireless communication standard. The legacy devices 506 may be STAs or IEEE STAs. The STAs 504 may be wireless transmit and receive devices such as cellular telephone, portable electronic wireless communication devices, smart telephone, handheld wireless device, wireless glasses, wireless watch, wireless personal device, tablet, or another device that may be transmitting and receiving using the IEEE 802.11 protocol such as IEEE 802.11be or another wireless protocol.

The AP 502 may communicate with legacy devices 506 in accordance with legacy IEEE 802.11 communication techniques. In example embodiments, the H AP 502 may also be configured to communicate with STAs 504 in accordance with legacy IEEE 802.11 communication techniques.

In some embodiments, a HE or EHT frames may be configurable to have the same bandwidth as a channel. The HE or EHT frame may be a physical Layer (PHY) Protocol Data Unit (PPDU). In some embodiments, PPDU may be an abbreviation for physical layer protocol data unit (PPDU). In some embodiments, there may be different types of PPDUs that may have different fields and different physical layers and/or different media access control (MAC) layers. For example, a single user (SU) PPDU, multiple-user (MU) PPDU, extended-range (ER) SU PPDU, and/or trigger-based (TB) PPDU. In some embodiments EHT may be the same or similar as HE PPDUs.

The bandwidth of a channel may be 20 MHz, 40 MHz, or 80 MHz, 80+80 MHz, 160 MHz, 160+160 MHz, 320 MHz, 320+320 MHz, 640 MHz bandwidths. In some embodiments, the bandwidth of a channel less than 20 MHz may be 1 MHz, 1.25 MHz, 2.03 MHz, 2.5 MHz, 4.06 MHz, 5 MHz and 10 MHz, or a combination thereof or another bandwidth that is less or equal to the available bandwidth may also be used. In some embodiments the bandwidth of the channels may be based on a number of active data subcarriers. In some embodiments the bandwidth of the channels is based on 26, 52, 106, 242, 484, 996, or 2×996 active data subcarriers or tones that are spaced by 20 MHz. In some embodiments the bandwidth of the channels is 256 tones spaced by 20 MHz. In some embodiments the channels are multiple of 26 tones or a multiple of 20 MHz. In some embodiments a 20 MHz channel may comprise 242 active data subcarriers or tones, which may determine the size of a Fast Fourier Transform (FFT). An allocation of a bandwidth or a number of tones or sub-carriers may be termed a resource unit (RU) allocation in accordance with some embodiments.

In some embodiments, the 26-subcarrier RU and 52-subcarrier RU are used in the 20 MHz, 40 MHz, 80 MHz, 160 MHz and 80+80 MHz OFDMA HE PPDU formats. In some embodiments, the 106-subcarrier RU is used in the 20 MHz, 40 MHz, 80 MHz, 160 MHz and 80+80 MHz OFDMA and MU-MIMO HE PPDU formats. In some embodiments, the 242-subcarrier RU is used in the 40 MHz, 80 MHz, 160 MHz and 80+80 MHz OFDMA and MU-MIMO HE PPDU formats. In some embodiments, the 484-subcarrier RU is used in the 80 MHz, 160 MHz and 80+80 MHz OFDMA and MU-MIMO HE PPDU formats. In some embodiments, the 996-subcarrier RU is used in the 160 MHz and 80+80 MHz OFDMA and MU-MIMO HE PPDU formats. In some embodiments, two or more of the RUs are joined as an MRU.

A HE or EHT frame may be configured for transmitting a number of spatial streams, which may be in accordance with MU-MIMO and may be in accordance with OFDMA. In other embodiments, the AP 502, STA 504, and/or legacy device 506 may also implement different technologies such as code division multiple access (CDMA) 2000, CDMA 2000 1×, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, low-power BlueTooth®, or other technologies.

In accordance with some IEEE 802.11 embodiments, e.g, IEEE 802.11EHT/ax embodiments, a HE AP 502 may operate as a master station which may be arranged to contend for a wireless medium (e.g., during a contention period) to receive exclusive control of the medium for a transmission opportunity (TXOP). The AP 502 may transmit an EHT/HE trigger frame transmission, which may include a schedule for simultaneous UL/DL transmissions from STAs 504. The AP 502 may transmit a time duration of the TXOP and sub-channel information. During the TXOP, STAs 504 may communicate with the AP 502 in accordance with a non-contention based multiple access technique such as OFDMA or MU-MIMO. This is unlike conventional WLAN communications in which devices communicate in accordance with a contention-based communication technique, rather than a multiple access technique. During the HE or EHT control period, the AP 502 may communicate with STAs 504 using one or more HE or EHT frames. During the TXOP, the HE STAs 504 may operate on a sub-channel smaller than the operating range of the AP 502. During the TXOP, legacy stations refrain from communicating. The legacy stations may need to receive the communication from the HE AP 502 to defer from communicating.

In accordance with some embodiments, during the TXOP the STAs 504 may contend for the wireless medium with the legacy devices 506 being excluded from contending for the wireless medium during the master-sync transmission. In some embodiments the trigger frame may indicate an UL-MU-MIMO and/or UL OFDMA TXOP. In some embodiments, the trigger frame may include a DL UL-MU-MIMO and/or DL OFDMA with a schedule indicated in a preamble portion of trigger frame.

In some embodiments, the multiple-access technique used during the HE or EHT TXOP may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique. In some embodiments, the multiple access technique may be a Code division multiple access (CDMA).

The AP 502 may also communicate with legacy devices 506 and/or STAs 504 in accordance with legacy IEEE 802.11 communication techniques. In some embodiments, the AP 502 may also be configurable to communicate with STAs 504 outside the TXOP in accordance with legacy IEEE 802.11 or IEEE 802.11EHT/ax communication techniques, although this is not a requirement.

In some embodiments the STA 504 may be a "group owner" (GO) for peer-to-peer modes of operation. A wireless device may be a STA 504 or a HE AP 502.

In some embodiments, the STA 504 and/or AP 502 may be configured to operate in accordance with IEEE 802.11mc. In example embodiments, the radio architecture of FIG. 1 is configured to implement the STA 504 and/or the AP 502. In example embodiments, the front-end module circuitry of FIG. 2 is configured to implement the STA 504 and/or the AP 502. In example embodiments, the radio IC circuitry of FIG. 3 is configured to implement the STA 504 and/or the AP 502. In example embodiments, the base-band processing circuitry of FIG. 4 is configured to implement the STA 504 and/or the AP 502.

In example embodiments, the STAs 504, AP 502, an apparatus of the STA 504, and/or an apparatus of the AP 502 may include one or more of the following: the radio architecture of FIG. 1, the front-end module circuitry of FIG. 2, the radio IC circuitry of FIG. 3, and/or the base-band processing circuitry of FIG. 4.

In example embodiments, the radio architecture of FIG. 1, the front-end module circuitry of FIG. 2, the radio IC circuitry of FIG. 3, and/or the base-band processing circuitry of FIG. 4 may be configured to perform the methods and operations/functions herein described in conjunction with FIGS. 1-12.

In example embodiments, the STAs 504 and/or the HE AP 502 are configured to perform the methods and operations/functions described herein in conjunction with FIGS. 1-11. In example embodiments, an apparatus of the STA 504 and/or an apparatus of the AP 502 are configured to perform the methods and functions described herein in conjunction with FIGS. 1-11. The term Wi-Fi may refer to one or more of the IEEE 802.11 communication standards. AP and STA may refer to EHT/HE access point and/or EHT/HE station as well as legacy devices 506.

In some embodiments, a HE AP STA may refer to an AP 502 and/or STAs 504 that are operating as EHT APs 502. In some embodiments, when a STA 504 is not operating as an AP, it may be referred to as a non-AP STA or non-AP. In some embodiments, STA 504 may be referred to as either an AP STA or a non-AP. In some embodiments, the AP 502 is an AP of the AP MLD 808. In some embodiments, the STA 504 is a STA of non-AP MLD 3 809.

Figure 6:
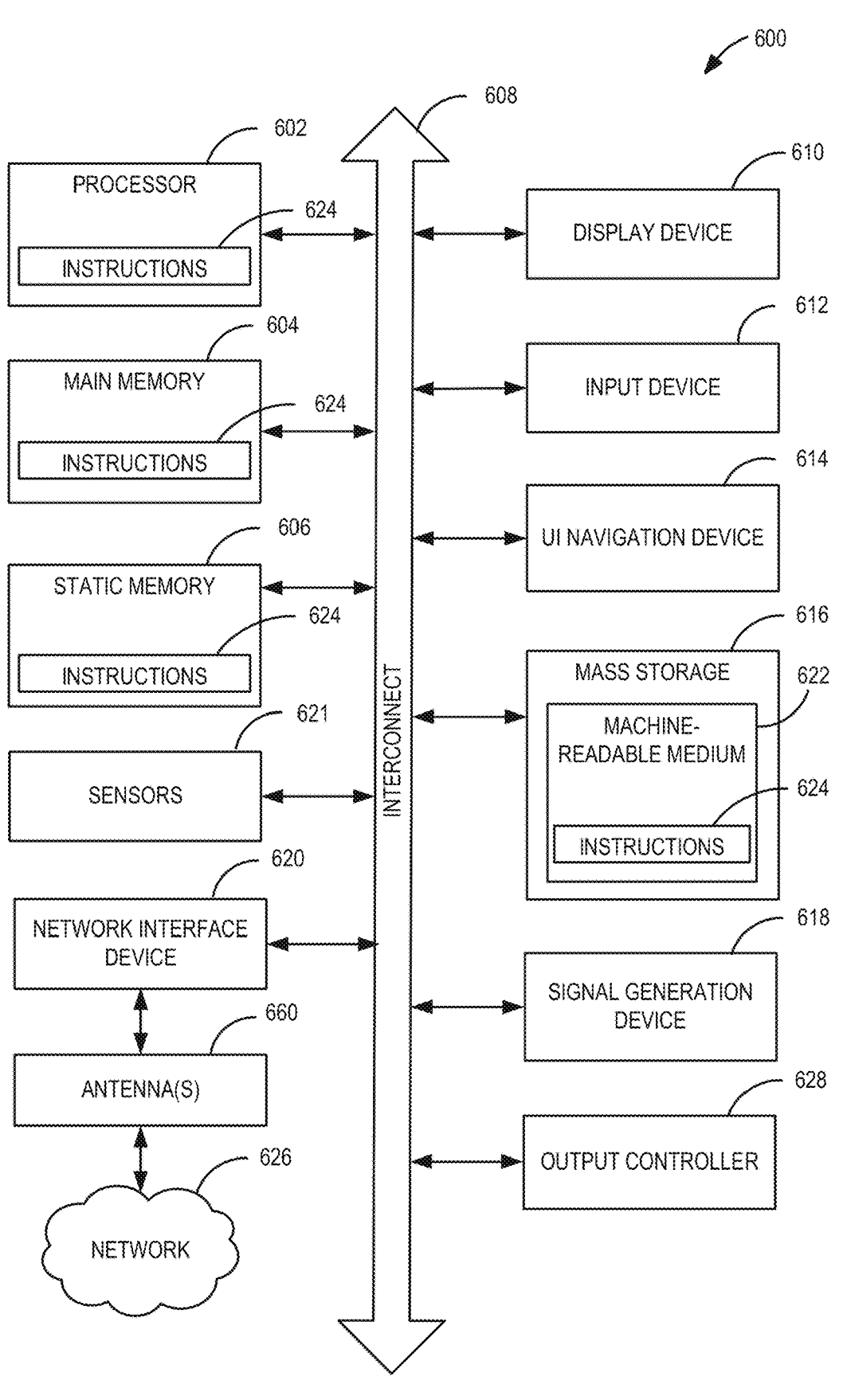
FIG. 6 illustrates a block diagram of an example machine upon which any one or more of the techniques (e.g., methodologies) discussed herein may perform.

FIG. 6 illustrates a block diagram of an example machine 600 upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a HE AP 502, EHT station 504, personal computer (PC), a tablet PC, a set-top box (STB), a personal digital assistant (PDA), a portable communications device, a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608.

Specific examples of main memory 604 include Random Access Memory (RAM), and semiconductor memory devices, which may include, in some embodiments, storage locations in semiconductors such as registers. Specific examples of static memory 606 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

The machine 600 may further include a display device 610, an input device 612 (e.g., a keyboard), and a user interface (UI) navigation device 614 (e.g., a mouse). In an example, the display device 610, input device 612 and UI navigation device 614 may be a touch screen display. The machine 600 may additionally include a mass storage (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared(IR), near field communication (NFC), etc.) connection to communicate or control one or more peripheral devices (e.g., a printer, card reader, etc.). In some embodiments the processor 602 and/or instructions 624 may comprise processing circuitry and/or transceiver circuitry.

The mass device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the mass storage 616 may constitute machine readable media.

Specific examples of machine readable media may include: non-volatile memory, such as semiconductor memory devices (e.g., EPROM or EEPROM) and flash memory devices; magnetic disks, such as internal hard disks and removable disks; magneto-optical disks; RAM; and CD-ROM and DVD-ROM disks.

While the machine readable medium 622 is illustrated as a single medium, the term "machine readable medium" may include a single medium or multiple media (e.g., a centralized or distributed database, and/or associated caches and servers) configured to store the one or more instructions 624.

An apparatus of the machine 600 may be one or more of a hardware processor 602 (e.g., a central processing unit (CPU), a graphics processing unit (GPU), a hardware processor core, or any combination thereof), a main memory 604 and a static memory 606, sensors 621, network interface device 620, antennas 660, a display device 610, an input device 612, a UI navigation device 614, a mass storage 616, instructions 624, a signal generation device 618, and an output controller 628. The apparatus may be configured to perform one or more of the methods and/or operations disclosed herein. The apparatus may be intended as a component of the machine 600 to perform one or more of the methods and/or operations disclosed herein, and/or to perform a portion of one or more of the methods and/or operations disclosed herein. In some embodiments, the apparatus may include a pin or other means to receive power. In some embodiments, the apparatus may include power conditioning hardware.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine-readable media. In some examples, machine readable media may include machine readable media that is not a transitory propagating signal.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 620 may include one or more physical jacks (e.g., Ethernet, coaxial, or phone jacks) or one or more antennas to connect to the communications network 626. In an example, the network interface device 620 may include one or more antennas 660 to wirelessly communicate using at least one of single-input multiple-output (SIMO), multiple-input multiple-output (MIMO), or multiple-input single-output (MISO) techniques. In some examples, the network interface device 620 may wirelessly communicate using Multiple User MIMO techniques. The term "transmission medium" shall be taken to include any intangible medium that is capable of storing, encoding or carrying instructions for execution by the machine 600, and includes digital or analog communications signals or other intangible medium to facilitate communication of such software.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Some embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

Figure 7:
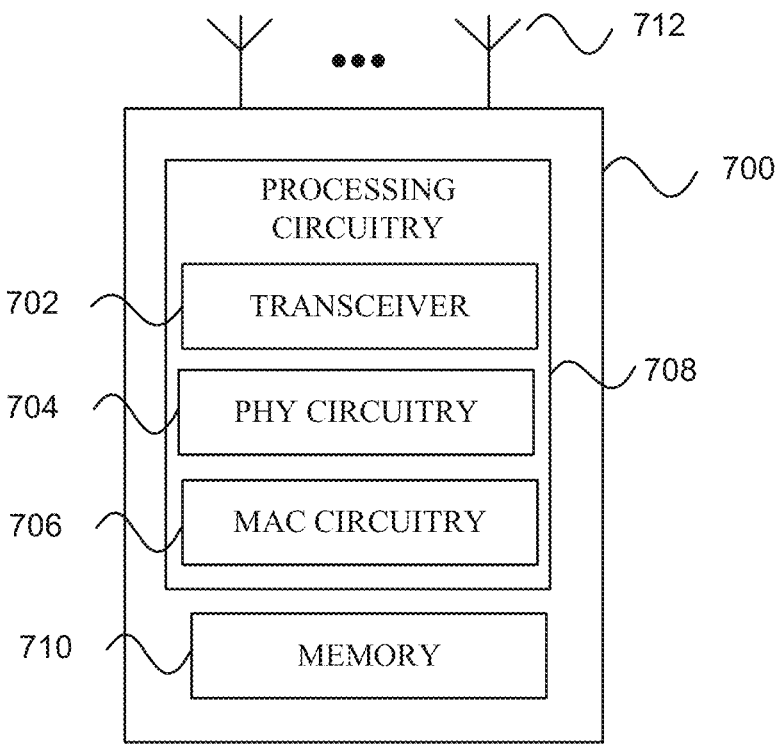
FIG. 7 illustrates a block diagram of an example wireless device upon which any one or more of the techniques (e.g., methodologies or operations) discussed herein may perform.

FIG. 7 illustrates a block diagram of an example wireless device 700 upon which any one or more of the techniques (e.g., methodologies or operations) discussed herein may perform. The wireless device 700 may be a HE device or HE wireless device. The wireless device 700 may be a HE STA 504, HE AP 502, and/or a HE STA or HE AP. A HE STA 504, HE AP 502, and/or a HE AP or HE STA may include some or all of the components shown in FIGS. 1-7. The wireless device 700 may be an example machine 600 as disclosed in conjunction with FIG. 6.

The wireless device 700 may include processing circuitry 708. The processing circuitry 708 may include a transceiver 702, physical layer circuitry (PHY circuitry) 704, and MAC layer circuitry (MAC circuitry) 706, one or more of which may enable transmission and reception of signals to and from other wireless devices 700 (e.g., HE AP 502, HE STA 504, and/or legacy devices 506) using one or more antennas 712. As an example, the PHY circuitry 704 may perform various encoding and decoding functions that may include formation of baseband signals for transmission and decoding of received signals. As another example, the transceiver 702 may perform various transmission and reception functions such as conversion of signals between a baseband range and a Radio Frequency (RF) range.

Accordingly, the PHY circuitry 704 and the transceiver 702 may be separate components or may be part of a combined component, e.g., processing circuitry 708. In addition, some of the described functionality related to transmission and reception of signals may be performed by a combination that may include one, any or all of the PHY circuitry 704 the transceiver 702, MAC circuitry 706, memory 710, and other components or layers. The MAC circuitry 706 may control access to the wireless medium. The wireless device 700 may also include memory 710 arranged to perform the operations described herein, e.g., some of the operations described herein may be performed by instructions stored in the memory 710.

The antennas 712 (some embodiments may include only one antenna) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 712 may be effectively separated to take advantage of spatial diversity and the different channel characteristics that may result.

One or more of the memory 710, the transceiver 702, the PHY circuitry 704, the MAC circuitry 706, the antennas 712, and/or the processing circuitry 708 may be coupled with one another. Moreover, although memory 710, the transceiver 702, the PHY circuitry 704, the MAC circuitry 706, the antennas 712 are illustrated as separate components, one or more of memory 710, the transceiver 702, the PHY circuitry 704, the MAC circuitry 706, the antennas 712 may be integrated in an electronic package or chip.

In some embodiments, the wireless device 700 may be a mobile device as described in conjunction with FIG. 6. In some embodiments the wireless device 700 may be configured to operate in accordance with one or more wireless communication standards as described herein (e.g., as described in conjunction with FIGS. 1-6, IEEE 802.11). In some embodiments, the wireless device 700 may include one or more of the components as described in conjunction with FIG. 6 (e.g., display device 610, input device 612, etc.) Although the wireless device 700 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

In some embodiments, an apparatus of or used by the wireless device 700 may include various components of the wireless device 700 as shown in FIG. 7 and/or components from FIGS. 1-6. Accordingly, techniques and operations described herein that refer to the wireless device 700 may be applicable to an apparatus for a wireless device 700 (e.g., HE AP 502 and/or HE STA 504), in some embodiments. In some embodiments, the wireless device 700 is configured to decode and/or encode signals, packets, and/or frames as described herein, e.g., PPDUs.

In some embodiments, the MAC circuitry 706 may be arranged to contend for a wireless medium during a contention period to receive control of the medium for a HE TXOP and encode or decode an HE PPDU. In some embodiments, the MAC circuitry 706 may be arranged to contend for the wireless medium based on channel contention settings, a transmitting power level, and a clear channel assessment level (e.g., an energy detect level).

The PHY circuitry 704 may be arranged to transmit signals in accordance with one or more communication standards described herein. For example, the PHY circuitry 704 may be configured to transmit a HE PPDU. The PHY circuitry 704 may include circuitry for modulation/demodulation, upconversion/downconversion, filtering, amplification, etc. In some embodiments, the processing circuitry 708 may include one or more processors. The processing circuitry 708 may be configured to perform functions based on instructions being stored in a RAM or ROM, or based on special purpose circuitry. The processing circuitry 708 may include a processor such as a general purpose processor or special purpose processor. The processing circuitry 708 may implement one or more functions associated with antennas 712, the transceiver 702, the PHY circuitry 704, the MAC circuitry 706, and/or the memory 710. In some embodiments, the processing circuitry 708 may be configured to perform one or more of the functions/operations and/or methods described herein.

In mmWave technology, communication between a station (e.g., the HE stations 504 of FIG. 5 or wireless device 700) and an access point (e.g., the HE AP 502 of FIG. 5 or wireless device 700) may use associated effective wireless channels that are highly directionally dependent. To accommodate the directionality, beamforming techniques may be utilized to radiate energy in a certain direction with certain beamwidth to communicate between two devices. The directed propagation concentrates transmitted energy toward a target device in order to compensate for significant energy loss in the channel between the two communicating devices. Using directed transmission may extend the range of the millimeter-wave communication versus utilizing the same transmitted energy in omni-directional propagation.

Figure 8:
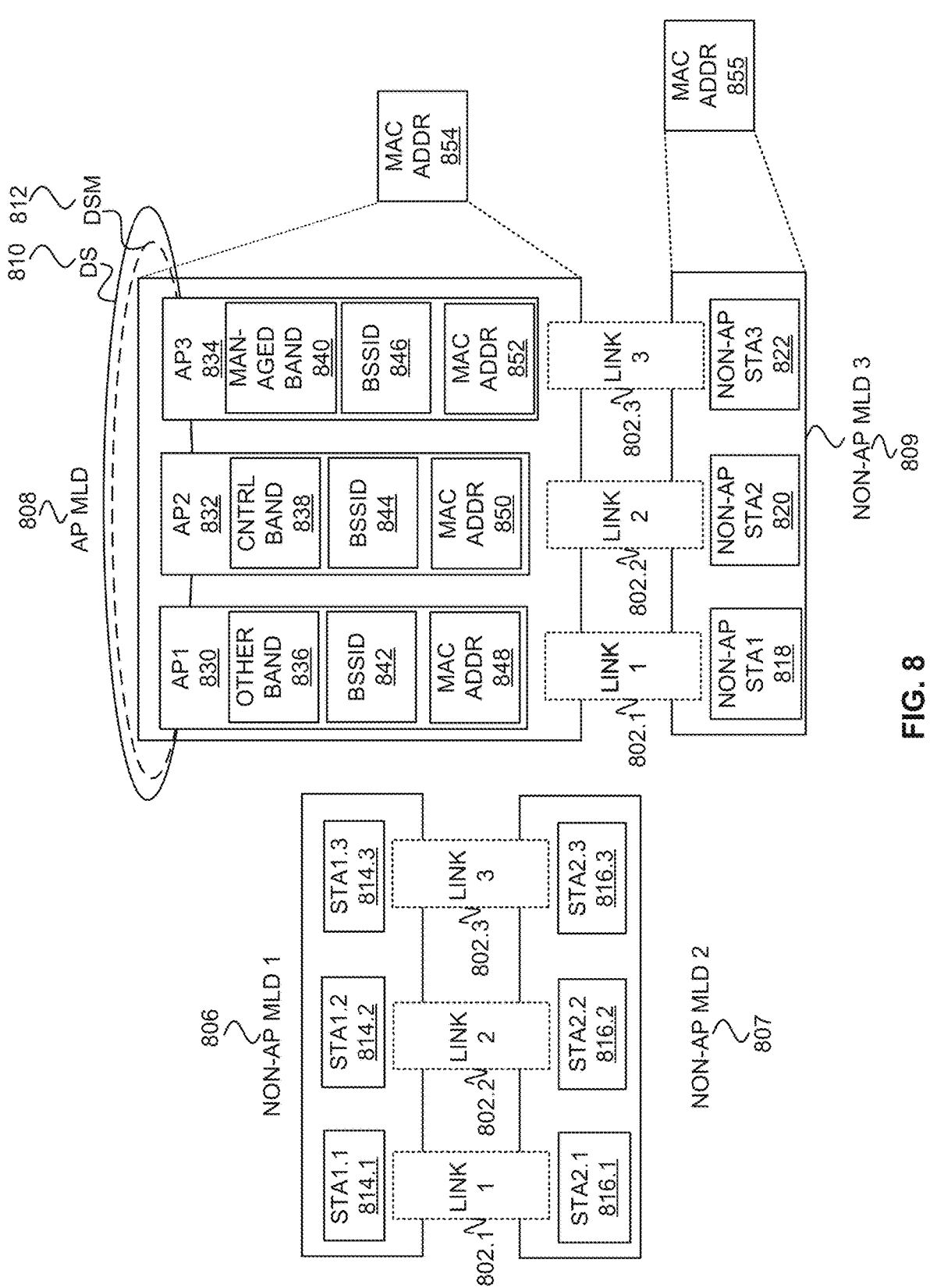
FIG. 8 illustrates multi-link devices (MLDs), in accordance with some embodiments.

FIG. 8 illustrates multi-link devices (MLDs), in accordance with some embodiments. Illustrated in FIG. 8 is ML logical entity 1 or non-AP MLD 1 806, ML logical entity 2 or non-AP MLD 2 807, ML AP logical entity or AP MLD 808, and ML non-AP logical entity or non-AP MLD 3 809. The non-AP MLD 1 806 includes three STAs, STA1.1 814.1, STA1.2 814.2, and STA1.3 814.3 that operate in accordance with link 1 802.1, link 2 802.2, and link 3 802.3, respectively. The Links are described below. Non-AP MLD 2 807 includes STA2.1 816.1, STA2.2 816.2, and STA2.3 816.3 that operate in accordance with link 1 802.1, link 2 802.2, and link 3 802.3, respectively. In some embodiments non-AP MLD 1 806 and non-AP MLD 2 807 operate in accordance with a mesh network. Using three links enables the non-AP MLD 1 806 and non-AP MLD 2 807 to operate using a greater bandwidth and to operate more reliably as they can switch to using a different link if there is interference or if one link is superior due to operating conditions.

The distribution system (DS) 810 indicates how communications are distributed and the DS medium (DSM) 812 indicates the medium that is used for the DS 810, which in this case is the wireless spectrum.

AP MLD 808 includes AP1 830, AP2 832, and AP3 834 operating on link 1 802.1, link 2 802.2, and link 3 802.3, respectively. AP MLD 808 includes a MAC address 854 that may be used by applications to transmit and receive data across one or more of AP1 830, AP2 832, and AP3 834.

AP1 830, AP2 832, and AP3 834 include a frequency band, which are other band 836, control (CNTRL) band 838, and managed band 840, respectively. The links 802.1, 802.2, and 802.3 are frequency bands such as 2.4 GHz band, 5 GHz band, 6 GHz band, 7 GHz band, 1-10 GHz, and so forth. The CNTRL band 838 is an unregulated band as described below.

AP1 830, AP2 832, and AP3 834 may operate different BSSIDs, which are BSSID 842, BSSID 844, and BSSID 846, respectively. AP1 830, AP2 832, and AP3 834 include different media access control (MAC) address (addr), which are MAC adder 848, MAC addr 850, and MAC addr 852, respectively. The AP 502 is an AP MLD 808, in accordance with some embodiments. The STA 504 is a non-AP MLD 3 809, in accordance with some embodiments.

The non-AP MLD 3 809 includes non-AP STA1 818, non-AP STA2 820, and non-AP STA3 822. Each of the non-AP STAs have a MAC address (not illustrated) and the non-AP MLD 3 809 has a MAC address 855 that is different and used by application programs where the data traffic is split up among non-AP STA1 818, non-AP STA2 820, and non-AP STA3 822.

The STA 504 is a non-AP STA1 818, non-AP STA2 820, or non-AP STA3 822, in accordance with some embodiments. The non-AP STA1 818, non-AP STA2 820, and non-AP STA3 822 may operate as if they are associated with a BSS of AP1 830, AP2 832, or AP3 834, respectively, over link 1 804.1, link 2 804.2, and link 3 804.3, respectively.

A Multi-link device such as non-AP MLD 1 806 or non-AP MLD 2 807, is a logical entity that contains one or more STAs 814, 816. The non-AP MLD 1 806 and non-AP MLD 2 807 each has one MAC data service interface and primitives to the logical link control (LLC) and a single address associated with the interface, which can be used to communicate on the DSM 812. Multi-link logical entity allows STAs 814, 816 within the multi-link logical entity to have the same MAC address, in accordance with some embodiments. In some embodiments a same MAC address is used for application layers and a different MAC address is used per link 802.

In infrastructure framework, AP MLD 808, includes APs 830, 832, 834, on one side, and non-AP MLD 3 809 includes non-APs STAs 818, 820, 822 on the other side. AP MLD 808 is a ML logical entity, where each STA within the multi-link logical entity is an EHT AP 502, in accordance with some embodiments. Non-AP MLD 1 806, non-AP MLD 2 807, non-AP MLD 809 are multi-link logical entities, where each STA within the multi-link logical entity is a non-AP EHT STA 504. AP1 830, AP2 832, and AP3 834 may be operating on different bands and there may be fewer or more APs. STA1.1 814.1, STA1.2 814.2, and STA1.3 814.3 may be operating on different bands and there may be fewer or more STAs as part of the non-AP MLD 3 809.

In some embodiments, a multi-link device (MLD), 806 or 807, is a device that is a logical entity and has more than one affiliated station (STA), e.g., STAs 814, and has a single medium access control (MAC) service access point (SAP) to logical link control (LLC), which includes one MAC data service.

In some embodiments, a physical layer protocol data unit may be a physical layer conformance procedure (PLCP) protocol data unit (PPDU). In some embodiments, the AP and STAs may communicate in accordance with one of the IEEE 802.11 standards. IEEE Std 802.11-2020 is incorporated herein by reference.

IEEE 802.11bf is a draft standard that aims to standardize WLAN sensing that uses Wi-Fi technology to perform radar-like applications such as detecting motion in a room or detecting when a person approaches a target device. IEEE P802.11bf/D0.4, November 2022 is incorporated herein by reference. Sensing is performed by tracking channel estimates obtained when decoding multiple Wi-Fi packets over time and detecting variations that indicate an event of interest.

A WLAN sensing procedure allows a non-DMG STA to perform WLAN sensing. A WLAN sensing procedure is first composed of setup frame exchanges, which are sensing session setup and sensing measurement setup, followed by zero or more sensing measurement instance(s), and terminated either implicitly or explicitly with termination frame exchanges: Sensing measurement setup termination and sensing session termination. In the sensing session setup, a sensing session, which is an agreement between an AP and a non-AP STA to participate in a WLAN sensing procedure, is established. In the sensing measurement setup, operational parameters associated with sensing measurement instance(s) are set. A sensing measurement instance is a frame exchange sequence resulting in obtaining and/or reporting sensing measurements. Two variants of sensing measurement instance are specified: Trigger-based (TB) sensing measurement instance and non-TB sensing measurement instance. A sensing measurement setup is active until either explicitly terminated in a sensing measurement setup termination, or implicitly terminated. In the sensing session termination, a sensing session is terminated, and all related active sensing measurement setups shall be terminated automatically. A STA acting as a sensing initiator may participate in a sensing measurement instance as a sensing transmitter, a sensing receiver, both a sensing transmitter and a sensing receiver, or neither a sensing transmitter nor a sensing receiver. A STA acting as a sensing responder may participate in a sensing measurement instance as a sensing transmitter, a sensing receiver, or both a sensing transmitter and a sensing receiver. A sensing initiator may choose not to participate in a sensing measurement instance as a sensing transmitter nor sensing receiver, but may still initiate the WLAN sensing procedure and optionally obtain sensing measurement reports. Operational parameters associated with sensing measurement instance(s) of a given Measurement Setup ID are set in the sensing measurement setup. Multiple sensing measurement setups may be established between a sensing initiator and a sensing responder which are assigned different Measurement Setup IDs. During a WLAN sensing procedure, an associated non-AP STA is identified by its AID and an unassociated non-AP STA is identified by its USID. The USIDs are assigned to unassociated STAs during the sensing measurement setup exchange. The AID and USID assignment shall be non-conflicting and shall have the same size and valid.

WLAN sensing is the use of PHY and MAC features of IEEE 802.11 stations to obtain measurements that may be useful to estimate features such as range, velocity, and motion of objects in an area of interest. Measurements obtained with WLAN sensing may be used to enable applications such as presence detection and gesture classification. IEEE 802.11bf is a draft standard that aims to standardize WLAN sensing that uses Wi-Fi technology to perform radar-like applications such as detecting motion in a room or detecting when a person approaches a target device. IEEE P802.11bf/D0.4, November 2022 is incorporated herein by reference. Sensing is performed by tracking channel estimates obtained when decoding multiple Wi-Fi packets over time and detecting variations that indicate an event of interest.

Threshold-based reporting is optional and may be present in a TB sensing measurement instance in which the sensing responder is in the role of sensing receiver. Threshold-based reporting phase consists of a CSI variation reporting sub-phase and may additionally include a measurement reporting sub-phase. Only sensing responders that report their CSI variation value greater than or equal to the CSI variation threshold assigned to them participate in the measurement reporting sub-phase. CSI variation indicates the quantified difference between the current measured CSI and the previous measured CSI at a sensing responder. The CSI variation threshold for each sensing responder to be compared with the CSI variation value is determined by the sensing initiator, and is transmitted to each sensing responder within a TBD frame. Different sensing responders may have different threshold values set by the sensing initiator.

If the non-AP STA is only the sensing transmitter, the Sensing NDP Announcement frame should configure the SR2SI NDP to be transmitted with the minimum possible length of one LTF symbol. If the non-AP STA is only the sensing receiver, the Sensing NDP Announcement frame should configure the SI2SR NDP to be transmitted with the minimum possible length of one LTF symbol.

In the polling phase, the AP polls five STAs, where STA1 and STA2 are sensing transmitters and STA3, STA4, and STA5 are sensing receivers. STA1-STA4 respond to the AP with CTS-to-self, so both TF sounding phase and NDPA sounding phase are present. In the TF sounding phase, the AP sends a Sensing Sounding Trigger frame to STA1 and STA2 to solicit sensing responder to sensing initiator (SR2SI) NDP transmissions. In the NDPA sounding phase, the AP sends a Sensing NDP Announcement frame followed by SI2SR NDP to STA3 and STA4.

SBP is a procedure that allows a non-AP STA to request an AP to perform WLAN sensing on its behalf. To establish an SBP procedure, the SBP initiator shall send an SBP Request frame to an SBP responder. Upon receipt of an SBP Request frame, the SBP responder either accepts the SBP procedure request, in which case the SBP responder shall send an SBP Response frame with Status Code field set to SUCCESS; or rejects the SBP procedure request, in which case the SBP responder shall send an SBP Response frame with Status Code field set to REQUEST DECLINED.

The SBP initiator shall include one Availability Window element in the SBP request frame indicating its availability for SBP reporting and for TB sensing measurement instance if the SBP initiator intends to be a sensing responder. The periodicity of the availability windows requested by the SBP initiator is expressed in units of 10 TUs in the Count subfield in the ISTA Availability Information field of the ISTA Availability Window element. The value of the Count subfield in the ISTA Availability Information field of the ISTA Availability Window element shall be a multiple of the Beacon Interval of the SBP responder in units of 10 TUs. The requested sensing measurement periodicity is the same as the requested periodicity of the availability windows.

In some embodiments, an AP may be configured to perform a WLAN sensing procedure. In these embodiments, the AP may encode a Sensing Sounding Trigger Frame for transmission to one or more of the STAs that are operating as sensing transmitters to solicit sensing packet transmissions. The AP may decode the sensing packet transmissions received from the one or more of the STAs that are operating as sensing transmitters. The AP may encode a Sensing Packet Announcement Frame for transmission followed by a sensing packet to one or more of the STAs that are operating as sensing receivers. The AP may also perform sensing measurements on the sensing packet transmissions received from the one or more of the STAs that are operating as sensing transmitters. During a reporting phase, the AP may be configured to encode a Sensing Report Trigger Frame for transmission to the one or more STAs that are operating as sensing receivers and decode a Sensing Measurement Report Frame sent by the one or more STAs that are operating as sensing receivers in response to the Sensing Report Trigger Frame, the Sensing Measurement Report Frame containing sensing measurement results.

In some embodiments, the channel measurements comprise measurements of channel variation based on channel state information (CSI), and the sensing measurements may be performed in accordance with a sensing measurement agreement. In some embodiments, the channel measurements may be based on long-training fields (LTFs) of sensing measurement packets. In these embodiments, the AP may estimate features such as range, velocity, and motion of objects in an area of interest based on the sensing measurements to enable applications such as presence detection and gesture classification. The AP may also determine channel state information (CSI) variation from the sensing measurements and the sensing measurement results for use in estimating motion of an object in an area of interest. In some embodiments, the sensing measurements may be performed in accordance with a measurement periodicity. In some embodiments, the CSI variation may be determined for each of a plurality of links with the AP and the AP may be configured to track the CSI variation for each of a plurality of links.

Figure 9:
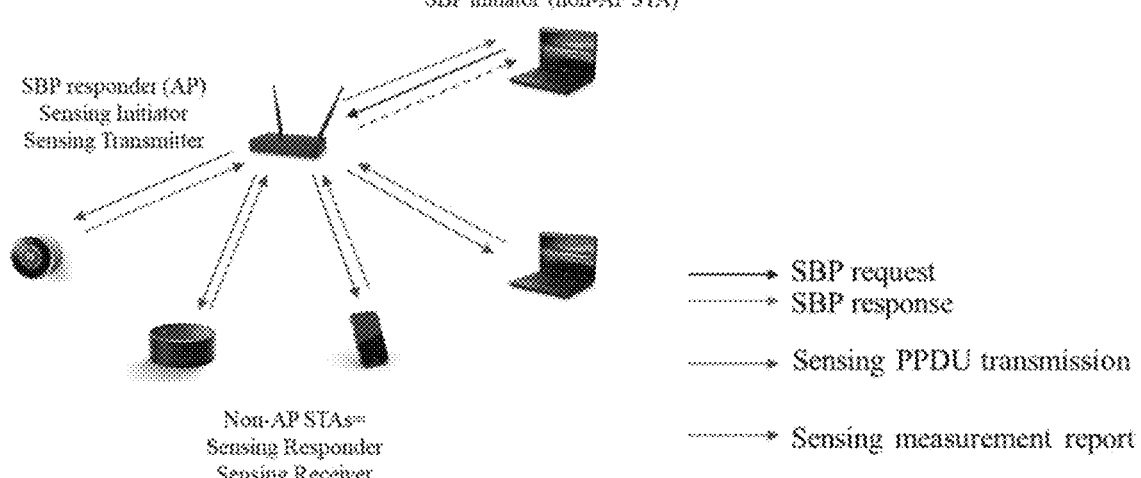
FIG. 9 illustrates an SBP procedure, in accordance with some embodiments.

FIG. 9 illustrates an SBP procedure, in accordance with some embodiments. SBP is a procedure that allows a non-AP STA to request an AP to perform WLAN sensing on its behalf.

SBP is a mechanism adopted in 11bf to enable a non-AP STA to obtain sensing measurements of the channel between an AP and one or more other non-AP STAs or between a receive antenna and a transmit antenna of an AP. With the execution of a SBP procedure, it is possible for a non-AP STA to obtain sensing measurements necessary for detecting and tracking changes in the environment, which otherwise the non-AP STA would not be able to perform due to its limited information of the other non-AP STAs.

Currently TGbf has defined a basic protocol to support SBP. Basically, a non-AP STA acting as a SBP initiator sends an SBP Request frame to an SBP responder capable AP to indicate its intent to ask the AP to initiate a sensing procedure and perform sensing measurement with other non-AP STAs. Once agreed, the SBP responder sends an SBP Response frame with status code SUCCESS and then follows the regular WLAN sensing procedure. The SBP initiator defined in the SBP Request frame whether sensing receiver(s) in the requested WLAN sensing procedure shall send or not send Sensing Measurement Report frames.

To terminate an existing SBP procedure, either the SBP initiator or the SBP responder can send a SBP Termination frame to indicate the termination of an existing SBP procedure. However, currently the design for SBP Termination frame is not finalized and there are several points that remain unaddressed. Embodiments disclosed herein provide a complete design of SBP Termination frame.

In some embodiments, an SBP Termination frame may include a SBP Termination Control field in the SBP Termination frame to include indications for the following functions. One bit of "Termination All SBP Setups" may be included to indicate whether all established SBP setups between the SBP initiator and SBP responder shall be terminated. One bit of "SBP Setup Unsuccess" may be included to indicate whether the termination of the SBP setup is because of the fact that the corresponding sensing measurement setups between the SBP responder AP and other non-AP STA sensing responders triggered by the acknowledged SBP request is not successful. For example, some requested sensing responders in indicated in the SBP Request frame are not accepting the sensing measurement setup request from the SBP responder AP.

In some embodiments, a Sensing Measurement Report frame for SBP scenarios provides a complete design of the SBP Termination frame for SBP scenarios. In these embodiments, the Sensing Measurement Report frame for SBP scenarios is consistent with the DMG SBP Termination frame design used in 60 GHz and may add flexibility in SBP termination.

FIG. 10A illustrates a format of the SBP Termination frame Action field, in accordance with some embodiments. Currently the SBP Termination frame is defined to be an Action or Action No Ack frame and the format of the SBP Termination frame Action field as illustrated in FIG. 10A.

FIG. 10B illustrates a format for the SBP Termination frame Action field with an SBP termination control field and an SBP parameters element field, in accordance with some embodiments. FIG. 10C illustrates a format for the SBP Termination Control field, in accordance with some embodiments.

In accordance with thee embodiments, a SBP Termination Control field in the SBP Termination frame may be included to include indications for the functions illustrated in FIG. 10B and FIG. 10C. In accordance with some embodiments, one bit of "Termination All SBP Setups" may be included to indicate whether all established SBP setups between the SBP initiator and SBP responder shall be terminated.

In accordance with embodiments, one bit of "SBP Setup Unsuccess" may be included to indicate whether the termination of the SBP setup is because of the fact that the corresponding sensing measurement setups between the SBP responder AP and other non-AP STA sensing responders triggered by the acknowledged SBP request is not successful. For example, some requested sensing responders indicated in the SBP Request frame are not ready to participate in the triggered WLAN sensing procedure in response to the SBP request anymore, which may be due to various reasons as follows: Some sensing responders do not accept the corresponding sensing measurement setup request from the SBP responder AP. Some sensing responders accepted the sensing measurement setup request, but later terminate the sensing measurement setup with the SBP responder AP.

FIG. 10D illustrates a format of an SBP Parameters element, in accordance with some embodiments. FIG. 10E illustrates a format of an SBP Parameters Control field, in accordance with some embodiments. In accordance with embodiments, an optional field "SBP Parameters element" may be included in the SBP Termination frame. This field is present only if the SBP Setup Unsuccess subfield in the SBP Termination Control field is set to 1. In some embodiments, the format of the SBP Parameters element may be the same as defined in the SBP Request or SBP Response frame. Examples of this are illustrated in FIG. 10D and FIG. 10E.

In some embodiments, when an SBP Parameters element is present in the SBP Termination frame, the latest information of the triggered WLAN sensing procedure in response to the SBP request may be provided. In these embodiments, the SBP Request subfield may be set to 0. In these embodiments, the subfields of the Sensing Responder, the Mandatory Number Responders, the Preferred Responder List, and the Mandatory Preferred Responder may be set equal to the subfields indicated in the SBP Parameters element of the SBP Request frame which initiated the SBP Setup indicated with the Measurement Setup ID. In some of these embodiments, the Number of Sensing Responders subfield indicates the actual number of sensing responders ready to participate in the triggered WLAN sensing procedure in response to the SBP request. In some of these embodiments, the Number of Preferred Sensing Responders subfield indicates the actual number of sensing responders with the known sensing responder addresses ready to participate in the triggered WLAN sensing procedure in response to the SBP request.

In accordance with embodiments, a rule for SBP Termination may be added wherein if an existing SBP setup is terminated, the SBP responder AP should terminate all corresponding sensing measurement setups established in response to the terminated SBP setup.

Some embodiments are directed to an access point station (AP) configured for performing wireless local area network (WLAN) sensing. In these embodiments, the AP may establish one or more sensing-by-proxy (SBP) procedures with a non-AP station (STA). In these embodiments, the STA may be acting as an SBP initiator and the AP may be acting as an SBP responder.

In these embodiments, the AP may encode an SBP termination frame for transmission to the STA to terminate one or more of the established SBP procedures by the AP when the AP acting as the SBP responder. In these embodiments, the SBP termination frame may be encoded to include a Measurement Setup ID field 1002 (FIG. 10B) and a SBP Termination Control field 1004 (FIG. 10B). The SBP Termination Control field 1004 (FIG. 10C) may comprise a Terminate All SBP Setups subfield 1008 (FIG. 10C).

In these embodiments, the AP may set the Terminate All SBP Setups subfield 1008 to a first predetermined value (e.g., one (1)) to indicate that the AP is requesting that all established SBP procedures between the SBP initiator (i.e., the STA) and the SBP responder (i.e., the AP) are to be terminated. In these embodiments, the AP may set the Terminate All SBP Setups subfield 1008 to a second predetermined value (e.g., zero (0)) to indicate that the AP is requesting that a single one of the established SBP procedures between the SBP initiator (i.e., the STA) and the SBP responder (i.e., the AP) is to be terminated. In these embodiments, the SBP procedure to be terminated may be indicated by the Measurement Setup ID field 1002 (FIG. 10B).

In these embodiments, when the Terminate All SBP Setups subfield 1008 to the first predetermined value (e.g., one (1)), any value included in the Measurement Setup ID field 1002 may be viewed as meaningless since all established SBP procedures between the SBP initiator and the SBP responder are to be terminated. In these embodiments, when the Terminate All SBP Setups subfield 1008 to the second predetermined value (e.g., zero (0)), the value included in the Measurement Setup ID field 1002 indicates the associated SBP procedure that is to be terminated. In these embodiments, the SBP termination frame may be an IEEE 802.11 action frame configured to be in either a protected or unprotected form. In some embodiments, each of the one or more SBP procedures is associated with a Measurement Setup ID.

In some embodiments, the SBP Termination Control field 1004 (FIG. 10C) further comprises and a SBP Setup Unsuccess subfield 1010 (FIG. 10C). In these embodiments, when the Terminate All SBP Setups subfield 1008 is set to the second predetermined value (e.g., zero (0)) indicating that the AP is terminating an established SBP procedure identified by the Measurement Setup ID field 1002, the AP may set the SBP Setup Unsuccess subfield 1010 to a first predetermined value (e.g., one (1)) to indicate that the SBP procedure identified by the Measurement Setup ID field 1002 is being terminated due to error conditions.

In some embodiments, the AP may be configured to set the SBP Setup Unsuccess subfield 1010 to a second predetermined value (e.g., zero (0)) when the Terminate All SBP Setups subfield 1008 is set to the first predetermined value (e.g., one (1)) indicating that the AP is requesting that all established SBP procedures are to be terminated.

In some embodiments, when the SBP Setup Unsuccess subfield 1010 is set to the first predetermined value (e.g., one (1)) indicating that the SBP procedure identified by the Measurement Setup ID field 1002 is being terminated due to error conditions, the AP may encode the SBP termination frame to include a SBP parameters element 1006 (FIG. 10B) to provide the latest information that helps to understand why the SBP procedure is being terminated and what error conditions occurred. In these embodiments, when the SBP Setup Unsuccess subfield 1010 is not set to the first predetermined value (e.g., one (1)), the AP may refrain from including the SBP parameters element 1006 in the SBP termination frame. In these embodiments, the SBP parameters element 1006 is not included in the SBP termination frame when all established SBP procedures being terminated.

In some embodiments, the SBP parameters element 1006 (FIG. 10D), when included in the SBP termination frame, indicates operational parameters associated with a requested SBP procedure. In these embodiments, the SBP parameters element 1006 may be encoded to include an SBP Parameters Control field (FIG. 10E).

In some embodiments, the SBP Termination Control field 1004 further comprise a reserved subfield 1012 (FIG. 10C). The SBP Termination Control field 1004 may be an 8-bit field comprising the Terminate All SBP Setups subfield 1008 having one-bit, the SBP Setup Unsuccess subfield 1010 having one-bit and the reserved subfield 1012 having 6-bits, although the scope of the embodiments is not limited in this respect.

In some embodiments, the AP may decode an SBP request frame received from the STA when the STA is operating as the SBP initiator. The SBP request frame may be requesting that the AP perform WLAN sensing on behalf of the STA. In these embodiments, the AP may operate as the SBP responder. In these embodiments, the AP may encode a SBP response frame for transmission to the STA in response to receipt of the SBP request frame. The SBP response frame may be encoded with a status code field set to either SUCCESS or REQUEST_DENIED In these embodiments, when the status code field is set to SUCCESS, the AP may encode the SBP response frame to include a Measurement Setup ID. The Measurement Setup ID may comprise value corresponding to a sensing measurement setup for a SBP procedure. The AP may also initiate the sensing measurement setup for the Measurement Setup ID value. The AP may perform the SBP procedure with the STA and one or more other non-AP STAs. In these embodiments, the one or more other non-AP STAs may also be acting as SBP responders. In some embodiments, prior to transmission of the SBP response frame, the AP may initiate sensing measurement setups of the other STAs to satisfy the SBP request.

In some embodiments, for termination of one or more of the established SBP procedures by the STA when the STA acting as the SBP initiator, the AP may decode a SBP termination frame received from the STA. In these embodiments, the use of an SBP Termination frame allows either an SBP initiator or an SBP responder to terminate one or more established SBP procedures.

In some embodiments, the AP may receive sensing measurement results from the STA and one or more other non-AP STAs and may estimate features such as range, velocity, and motion of objects in an area of interest based on the sensing measurements to enable applications such as presence detection and gesture classification. In some embodiments, the sensing measurements may include channel measurements of a channel between the STA and the AP. The channel measurements may comprise measurements of channel variation based on channel state information (CSI). In some of these embodiments, the channel measurements may be based on long-training fields (LTFs) of sensing measurement packets.

Some embodiments are directed to a non-transitory computer-readable storage medium that stores instructions for execution by processing circuitry of an access point station (AP) configured for performing wireless local area network (WLAN) sensing.

Some embodiments are directed to a non-access point station (STA) configured for performing wireless local area network (WLAN) sensing. In these embodiments, the STA may establish one or more sensing-by-proxy (SBP) procedures with an access point station (AP). In these embodiments, the STA may be acting as an SBP initiator and the AP may be acting as an SBP responder. In these embodiments, the STA may decode an SBP termination frame received from the AP to terminate one or more of the established SBP procedures by the AP when the AP acting as the SBP responder. In these embodiments, the SBP termination frame may comprise a Measurement Setup ID field 1002 (FIG. 10B) and a SBP Termination Control field 1004 (FIG. 10B). The SBP Termination Control field 1004 (FIG. 10C) may comprise a Terminate All SBP Setups subfield 1008 (FIG. 10C). In these embodiments, the Terminate All SBP Setups subfield 1008 may be set to a first predetermined value (e.g., one (1)) to indicate that the AP is requesting that all established SBP procedures between the SBP initiator (i.e., the STA) and the SBP responder (i.e., the AP) are to be terminated. In these embodiments, the Terminate All SBP Setups subfield 1008 may be set to a second predetermined value (e.g., zero (0)) to indicate that the AP is requesting that a single one of the established SBP procedures between the SBP initiator (i.e., the STA) and the SBP responder (i.e., the AP) is to be terminated. In these embodiments, the SBP procedure to be terminated indicated by the Measurement Setup ID field 1002 (FIG. 10B).

FIG. 11 illustrates a procedure for performing wireless local area network (WLAN) sensing in accordance with some embodiments. Procedure 1100 may be performed by an access point station (AP) configured for performing wireless local area network (WLAN) sensing.

Operation 1102 comprises establishing one or more sensing-by-proxy (SBP) procedures with a non-AP station (STA). The STA may be acting as an SBP initiator and the AP may be acting as an SBP responder.

Operation 1104 comprises encoding an SBP termination frame for transmission to the STA to terminate one or more of the established SBP procedures by the AP. In these embodiments, the SBP termination frame is encoded to comprise a Measurement Setup ID field 1002 (FIG. 10B) and a SBP Termination Control field 1004 (FIG. 10B), the SBP Termination Control field 1004 (FIG. 10C) comprising a Terminate All SBP Setups subfield 1008 (FIG. 10C).

Operation 1106 comprises setting the Terminate All SBP Setups subfield 1008 to a first predetermined value (e.g., one (1)) to indicate that the AP is requesting that all established SBP procedures between the SBP initiator (i.e., the STA) and the SBP responder (i.e., the AP) are to be terminated.

Operation 1108 comprises setting the Terminate All SBP Setups subfield 1008 to a second predetermined value (e.g., zero (0)) to indicate that the AP is requesting that a single one of the established SBP procedures between the SBP initiator (i.e., the STA) and the SBP responder (i.e., the AP) is to be terminated, the SBP procedure to be terminated indicated by the Measurement Setup ID field 1002 (FIG. 10B).

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of an access point station (AP), the apparatus comprising: processing circuitry; and memory, the AP configured for performing wireless local area network (WLAN) sensing, wherein the processing circuitry is configured to:

establish multiple sensing-by-proxy (SBP) procedures between the AP and a non-AP station (STA), wherein for the multiple SBP procedures, the STA is an SBP initiator and the AP is an SBP responder; and encode an SBP termination frame for transmission to the STA to terminate one or more of the multiple SBP procedures by the AP, wherein the SBP termination frame is encoded to comprise a Measurement Setup ID field and a SBP Termination Control subfield, the SBP Termination Control subfield comprising a Terminate All SBP Procedures subfield, and wherein the processing circuitry is configured to:

set the Terminate All SBP Procedures subfield to a first predetermined value to indicate that the AP is requesting that all established SBP procedures between the SBP initiator and the SBP responder are to be terminated; and set the Terminate All SBP Procedures subfield to a second predetermined value to indicate that the AP is requesting that a single one of the established SBP procedures between the SBP initiator and the SBP responder is to be terminated, the single one of the multiple SBP procedures to be terminated indicated by the Measurement Setup ID field.

2. The apparatus of claim 1, wherein each of the multiple SBP procedures is associated with a Measurement Setup ID.

3. The apparatus of claim 2, wherein the SBP Termination Control subfield further comprises and a SBP Error Status subfield, wherein when the Terminate All SBP Setups subfield is set to the second predetermined value, the processing circuitry is configured to:

set the SBP Error Status subfield to a first predetermined value to indicate that the SBP procedure identified by the Measurement Setup ID field is being terminated due to error conditions.

4. The apparatus of claim 3, wherein the processing circuitry is further configured to set the SBP Error Status subfield to a second predetermined value when the Terminate All SBP Setups subfield is set to the first predetermined value.

5. The apparatus of claim 4, wherein when the SBP Error Status subfield is set to the first predetermined value indicating that the SBP procedure identified by the Measurement Setup ID field is being terminated due to error conditions, the processing circuitry is further configured to encode the SBP termination frame to include a SBP parameters element, and wherein when the SBP Error Status subfield is not set to the first predetermined value, the processing circuitry is configured to refrain from including the SBP parameters element in the SBP termination frame.

6. The apparatus of claim 5 wherein the SBP parameters element, when included in the SBP termination frame, indicates operational parameters associated with a requested SBP procedure, wherein the SBP parameters element is encoded to include an SBP Parameters Control field.

7. The apparatus of claim 6 wherein the SBP Termination Control subfield further comprises a reserved subfield, the SBP Termination Control subfield being an 8-bit field comprising the Terminate All SBP Setups subfield having one-bit, the SBP Error Status subfield having one-bit, and the reserved subfield having 6-bits.

8. The apparatus of claim 3, wherein as part of one of the multiple SBP procedures, the processing circuitry is further configured to:

decode an SBP request frame received from the STA, the SBP request frame requesting that the AP perform WLAN sensing on behalf of the STA; and encode an SBP response frame for transmission to the STA in response to receipt of the SBP request frame, the SBP response frame encoded with a status code field set to either SUCCESS or REQUEST_DENIED, wherein when the status code field is set to SUCCESS, the processing circuitry is configured to:

encode the SBP response frame to include a Measurement Setup ID, the Measurement Setup ID comprising value corresponding to a sensing measurement setup for the one of the multiple SBP procedures;

initiate the sensing measurement setup; and configure the AP to perform the SBP procedure with the STA and one or more other non-AP STAs, the one or more other non-AP STAs acting as SBP responders.

9. The apparatus of claim 3, wherein for termination of one or more of the multiple SBP procedures by the STA, the processing circuitry is configured to decode an SBP termination frame received from the STA.

10. The apparatus of claim 3, wherein as part of one of the multiple SBP procedures, the processing circuitry is further configured to:

receive sensing measurement results from the STA and one or more other non-AP STAS; and estimate features such as range, velocity, and motion of objects in an area of interest based on the sensing measurements to enable applications such as presence detection and gesture classification.

11. The apparatus of claim 10, wherein the sensing measurement results include channel measurements of a channel between the STA and the AP, the channel measurements comprise measurements of channel variation based on channel state information (CSI), and wherein the channel measurements are based on long-training fields (LTFs) of sensing measurement packets.

12. A non-transitory computer-readable storage medium that stores instructions for execution by processing circuitry of an access point station (AP) configured for performing wireless local area network (WLAN) sensing, wherein the processing circuitry is configured to:

establish multiple sensing-by-proxy (SBP) procedures between the AP and a non-AP station (STA), wherein for the multiple SBP procedures, the STA is an SBP initiator and the AP is an SBP responder; and encode an SBP termination frame for transmission to the STA to terminate one or more of the multiple SBP procedures by the AP, wherein the SBP termination frame is encoded to comprise a Measurement Setup ID field and a SBP Termination Control subfield, the SBP Termination Control subfield comprising a Terminate All SBP Procedures subfield, and wherein the processing circuitry is configured to:

set the Terminate All SBP Procedures subfield to a first predetermined value to indicate that the AP is requesting that all established SBP procedures between the SBP initiator and the SBP responder are to be terminated; and set the Terminate All SBP Procedures subfield to a second predetermined value to indicate that the AP is requesting that a single one of the established SBP procedures between the SBP initiator and the SBP responder is to be terminated, the single one of the multiple SBP procedures to be terminated indicated by the Measurement Setup ID field.

13. The non-transitory computer-readable storage medium of claim 12, wherein each of the multiple SBP procedures is associated with a Measurement Setup ID.

14. The non-transitory computer-readable storage medium of claim 13, wherein the SBP Termination Control subfield further comprises and a SBP Error Status subfield, wherein when the Terminate All SBP Setups subfield is set to the second predetermined value, the processing circuitry is configured to:

set the SBP Error Status subfield to a first predetermined value to indicate that the SBP procedure identified by the Measurement Setup ID field is being terminated due to error conditions.

15. The non-transitory computer-readable storage medium of claim 14, wherein the processing circuitry is further configured to set the SBP Error Status subfield to a second predetermined value when the Terminate All SBP Setups subfield is set to the first predetermined value.

16. The non-transitory computer-readable storage medium of claim 15, wherein when the SBP Error Status subfield is set to the first predetermined value indicating that the SBP procedure identified by the Measurement Setup ID field is being terminated due to error conditions, the processing circuitry is further configured to encode the SBP termination frame to include a SBP parameters element, and wherein when the SBP Error Status subfield is not set to the first predetermined value, the processing circuitry is configured to refrain from including the SBP parameters element in the SBP termination frame.

17. The non-transitory computer-readable storage medium of claim 16 wherein the SBP parameters element, when included in the SBP termination frame, indicates operational parameters associated with a requested SBP procedure, wherein the SBP parameters element is encoded to include an SBP Parameters Control field.

18. An apparatus of a non-access point station (STA), the apparatus comprising: processing circuitry; and memory, the STA configured for performing wireless local area network (WLAN) sensing, wherein the processing circuitry is configured to:

establish multiple sensing-by-proxy (SBP) procedures between an Access Point (AP) and the STA, wherein for the multiple SBP procedures, the STA is an SBP initiator and the AP is an SBP responder; and decode an SBP termination frame received from the STA indicating that the STA is requesting that the AP terminate one or more of the multiple SBP procedures, wherein the SBP termination frame includes a Measurement Setup ID field and a SBP Termination Control subfield, the SBP Termination Control subfield comprising a Terminate All SBP Procedures subfield, and wherein:

the Terminate All SBP Procedures subfield is set to a first predetermined value to indicate that the AP is requesting that all established SBP procedures between the SBP initiator and the SBP responder are to be terminated; and the Terminate All SBP Procedures subfield is set to a second predetermined value to indicate that the AP is requesting that a single one of the established SBP procedures between the SBP initiator and the SBP responder is to be terminated, the single one of the multiple SBP procedures to be terminated indicated by the Measurement Setup ID field.

19. The apparatus of claim 18, wherein each of the multiple SBP procedures is associated with a Measurement Setup ID.

20. The apparatus of claim 19, wherein the SBP Termination Control subfield further comprises and a SBP Error Status subfield, wherein when the Terminate All SBP Setups subfield is set to the second predetermined value, the SBP Error Status subfield is set to a first predetermined value to indicate that the SBP procedure identified by the Measurement Setup ID field is being terminated due to error conditions, and wherein the SBP Error Status subfield is set to a second predetermined value when the Terminate All SBP Setups subfield is set to the first predetermined value.

\* \* \* \* \*